US010316804B2

(12) United States Patent
Hasenfratz et al.

(10) Patent No.: US 10,316,804 B2
(45) Date of Patent: Jun. 11, 2019

(54) FILTER ELEMENT WITH AT LEAST ONE GUIDE CROSSPIECE, FILTER WITH A FILTER ELEMENT AND FILTER HOUSING OF A FILTER

(71) Applicant: MANN+HUMMEL GMBH, Ludwigsburg (DE)

(72) Inventors: Robert Hasenfratz, Schwaebisch-Hall (DE); Fabian Wagner, Moeglingen (DE); André Roesgen, Remshalden (DE); Christian Thalmann, Speyer (DE); Frank Pflueger, Sachsenheim (DE); Nadine Donauer, Fellbach (DE); Werner Blossey, Benningen (DE); Mario Rieger, Ludwigsburg (DE); Andreas Weber, Freiberg a. N. (DE); Pascal Neef, Leonberg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 173 days.

(21) Appl. No.: 15/583,445

(22) Filed: May 1, 2017

(65) Prior Publication Data

US 2017/0298876 A1    Oct. 19, 2017

Related U.S. Application Data

(63) Continuation of application No. 14/329,963, filed on Jul. 13, 2014, now Pat. No. 9,638,147.

(30) Foreign Application Priority Data

Jul. 12, 2013  (DE) .................... 10 2013 011 614

(51) Int. Cl.
*B01D 46/00* (2006.01)
*F02M 35/024* (2006.01)
(Continued)

(52) U.S. Cl.
CPC ..... *F02M 35/02416* (2013.01); *B01D 46/001* (2013.01); *B01D 46/10* (2013.01);
(Continued)

(58) Field of Classification Search
CPC B01D 46/10; B01D 46/4227; B01D 46/0006; B01D 46/001; B01D 2265/025; F02M 3/0202; F02M 3/02416
(Continued)

(56) References Cited

U.S. PATENT DOCUMENTS 3,494,113 A * 2/1970 Kinney .............. B01D 46/0005
                                                55/481
5,494,497 A * 2/1996 Lee .................... B01D 46/0006
                                                123/198 E
(Continued)

FOREIGN PATENT DOCUMENTS

WO    2008147585 A2    12/2008

*Primary Examiner* — Frank M Lawrence, Jr.
(74) *Attorney, Agent, or Firm* — James Hasselbeck

(57) ABSTRACT

A filter housing (11) has at least one inlet (15) and at least one outlet (17) for the fluid. The filter element (10) includes a filter body of a filter medium (18).The filter element (10) is configured to be arranged in a filter housing (11) separating the at least one inlet (15) from the at least one outlet (17). An element axis (14) of the filter element (10) and a housing axis (25) of the filter housing (11) can be aligned parallel or axially to an installation direction (12) of the filter element into the filter housing. The filter element (10) may include at least one guide crosspiece (46, 48) which extends axially and radially outward on a peripheral exterior side (26), relative to the element axis (14), of the filter element (10). The filter element (10) has at least one seal (42) running peripherally relative to the element axis (14), the seal (42) having a seal line with at least one convexity (54)
(Continued)

arranged peripherally between two corner regions of the filter element (10) and is separated by these corner regions.

10 Claims, 21 Drawing Sheets

(51) Int. Cl.
*B01D 46/10* (2006.01)
*B01D 46/42* (2006.01)
*F02M 35/02* (2006.01)

(52) U.S. Cl.
CPC .... *B01D 46/4227* (2013.01); *B01D 2265/025* (2013.01); *F02M 35/0202* (2013.01)

(58) Field of Classification Search
USPC ..... 55/385.3, 490, 497, 502, 506; 123/198 E
See application file for complete search history.

(56) References Cited

U.S. PATENT DOCUMENTS

| | | | |
|---|---|---|---|
| 6,264,713 B1* | 7/2001 | Lewis, II | B01D 46/0005 55/481 |
| 6,461,396 B1* | 10/2002 | Barker | B01D 46/0005 55/471 |
| 8,915,985 B2* | 12/2014 | Dewit | B01D 46/0005 55/481 |
| 2009/0064646 A1 | 3/2009 | Reichter et al. | |
| 2009/0064647 A1 | 3/2009 | Darnell | |
| 2012/0067013 A1 | 3/2012 | Budi | |
| 2013/0305930 A1 | 11/2013 | Oh | |
| 2014/0318091 A1* | 10/2014 | Rieger | B01D 46/10 55/502 |
| 2014/0318092 A1 | 10/2014 | Rieger et al. | |
| 2015/0007732 A1 | 1/2015 | Hasenfratz et al. | |

\* cited by examiner

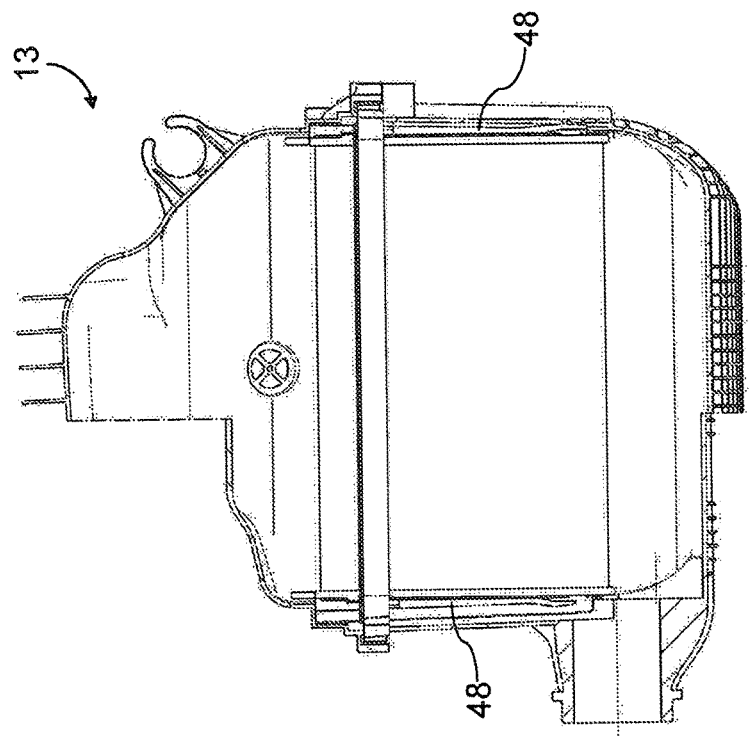
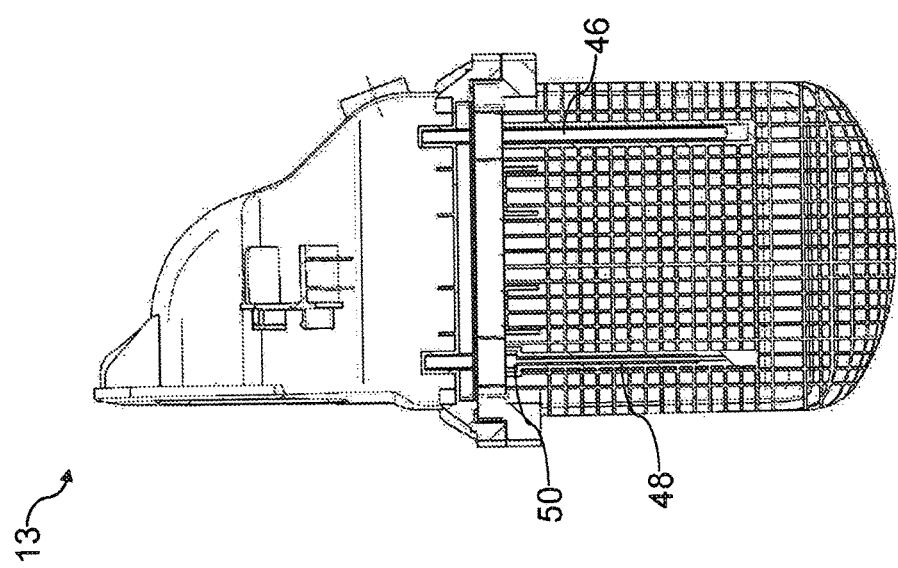

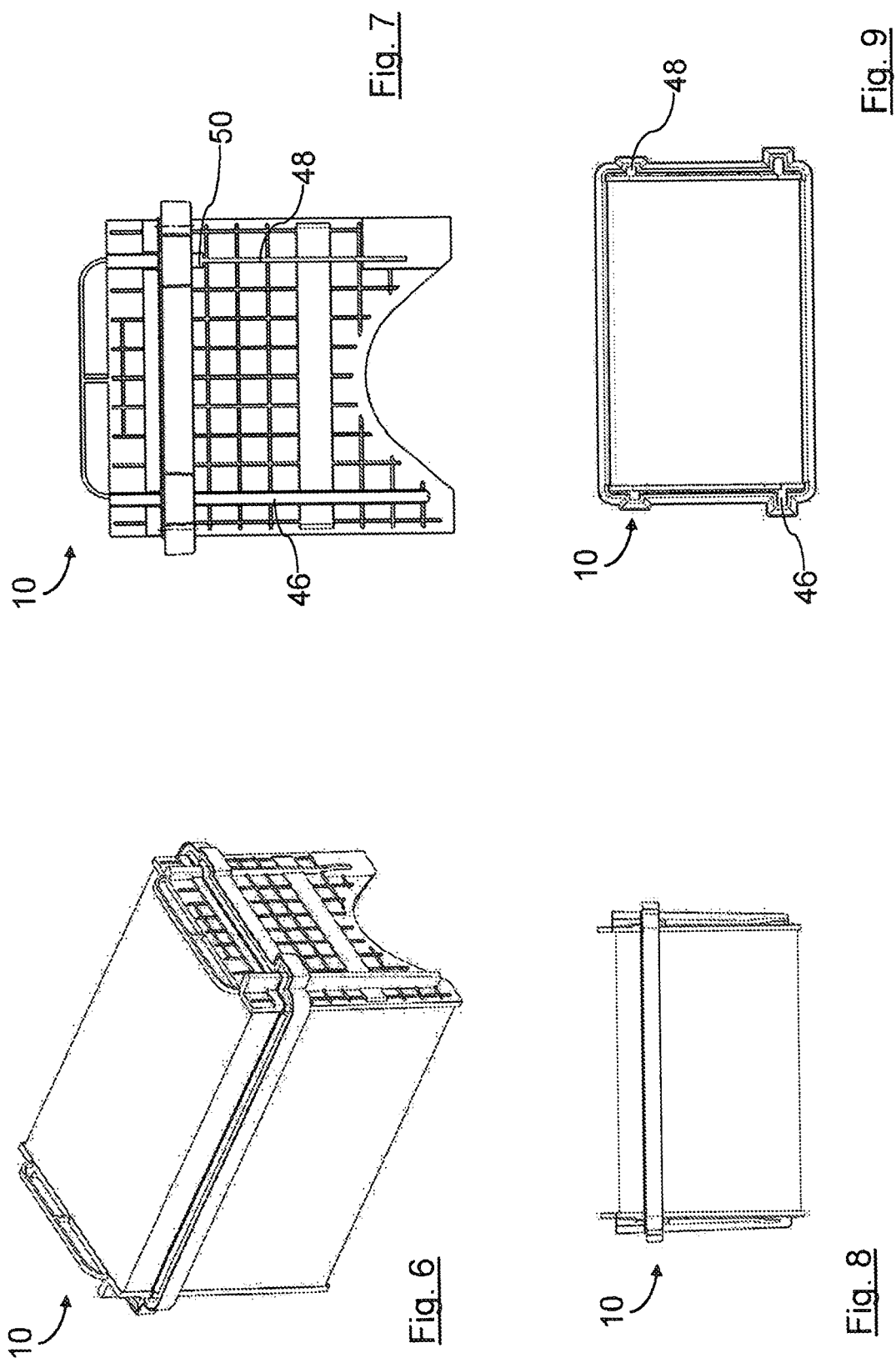

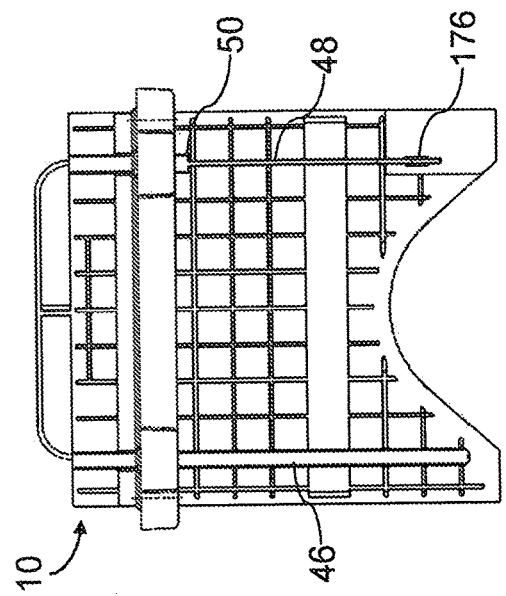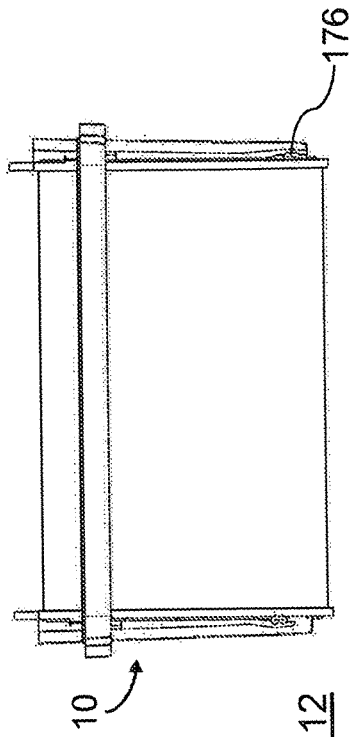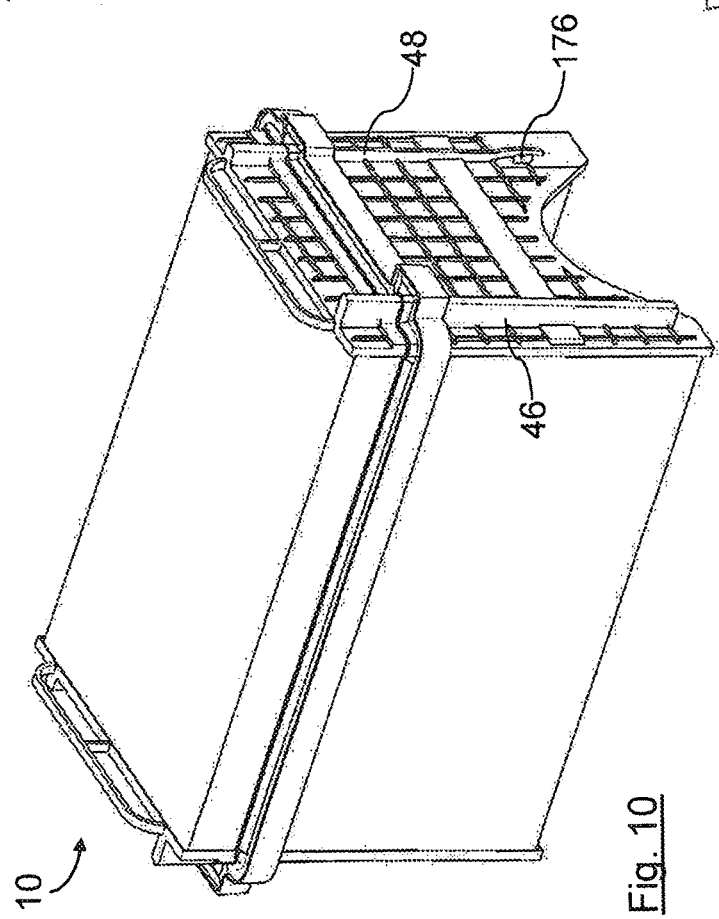

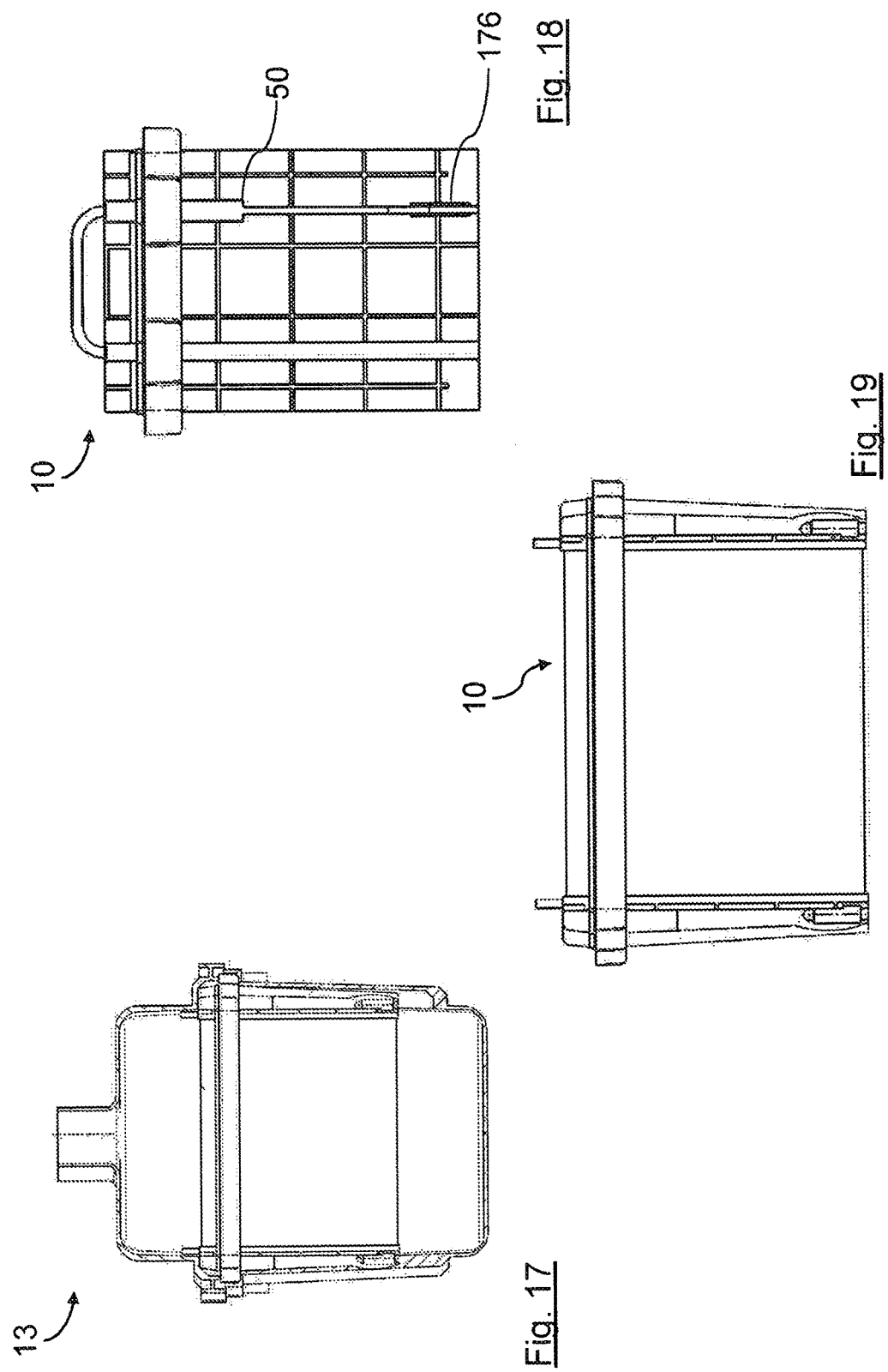

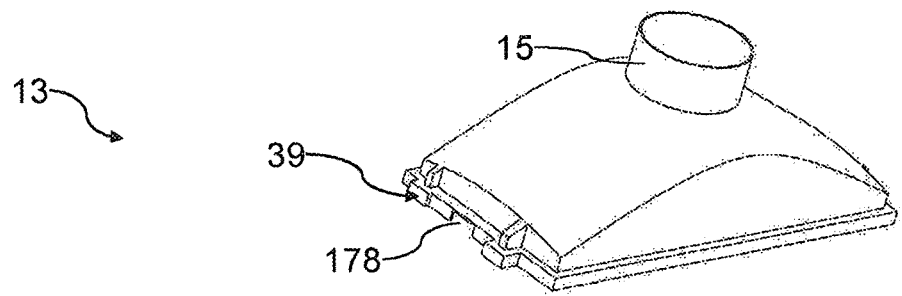
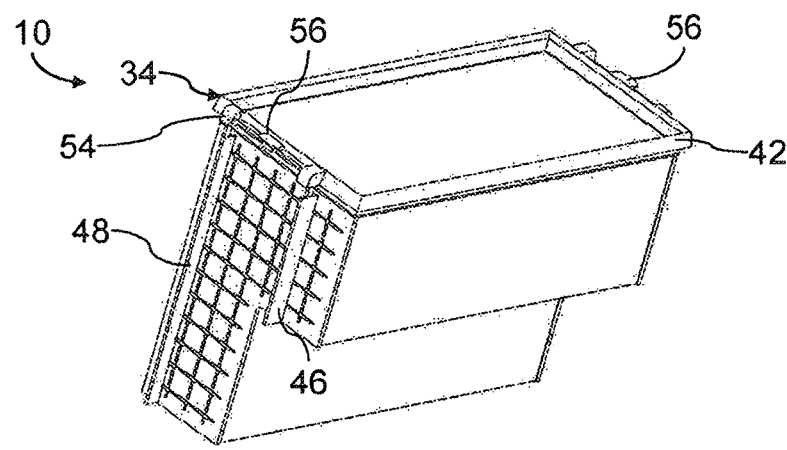
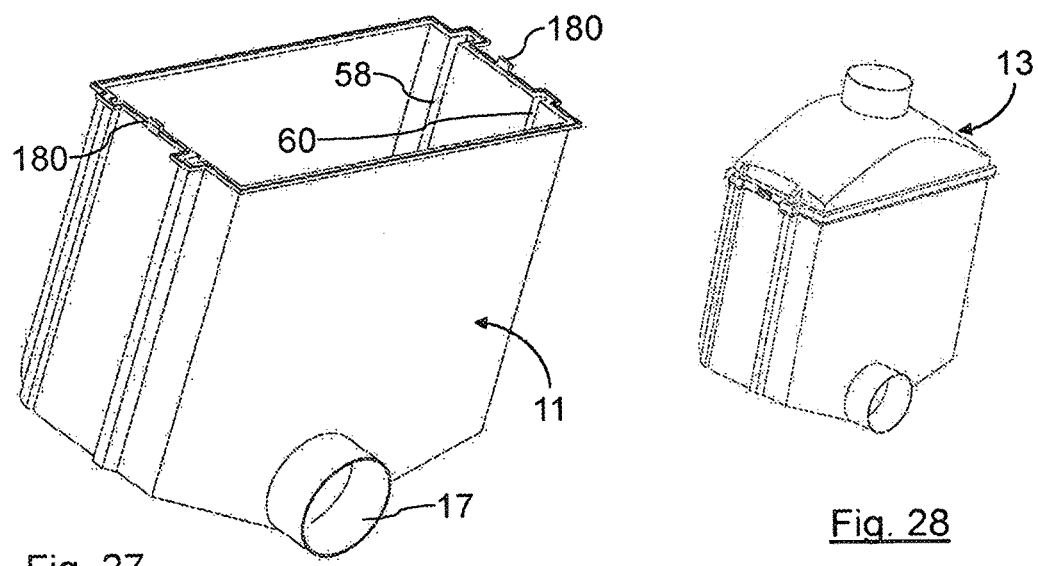
Fig. 27
Fig. 28

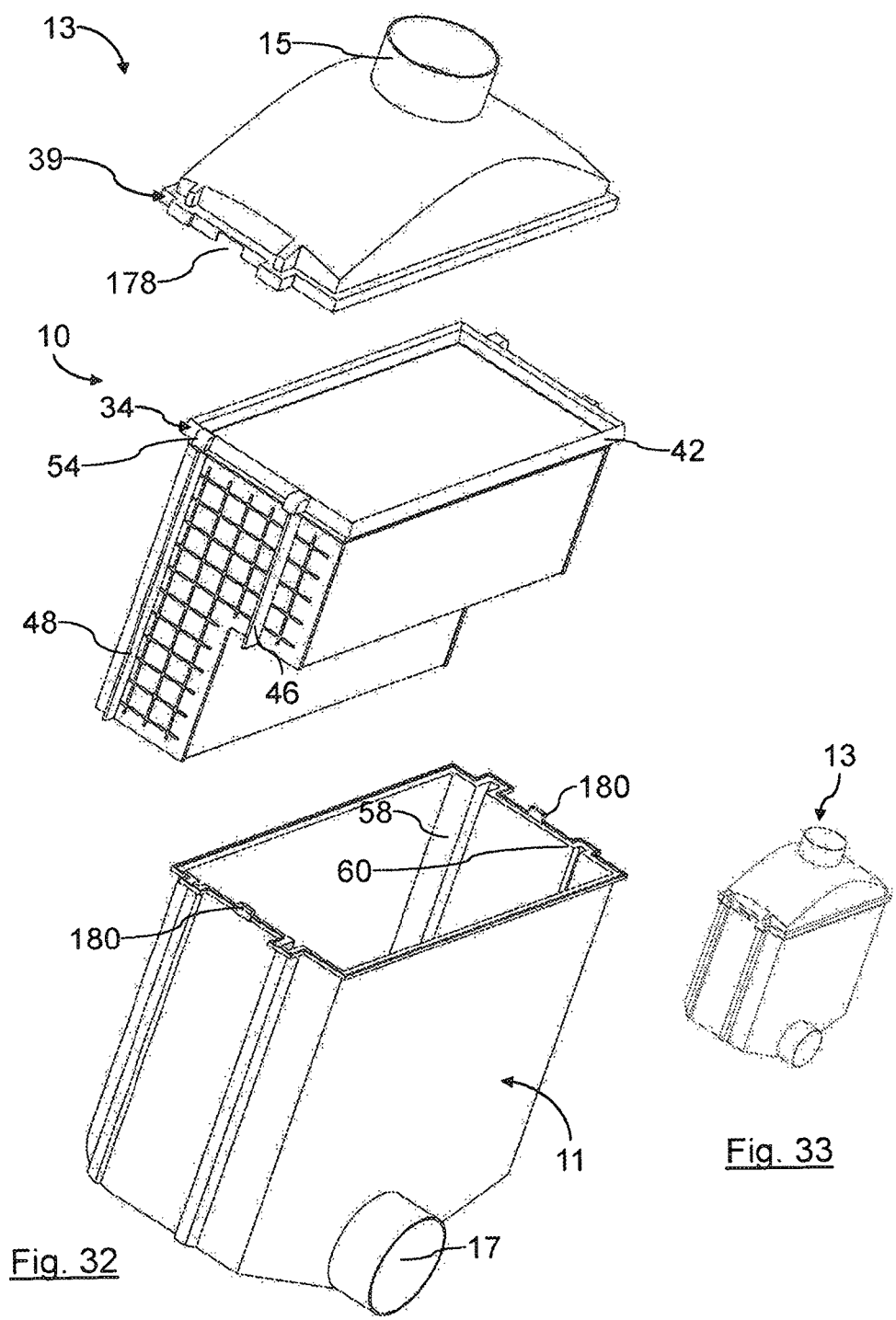

FILTER ELEMENT WITH AT LEAST ONE GUIDE CROSSPIECE, FILTER WITH A FILTER ELEMENT AND FILTER HOUSING OF A FILTER

CROSS-REFERENCE TO RELATED APPLICATION

This application is a continuation of U.S. patent application Ser. No. 14/329,963 filed Jul. 13, 2014 which claims the benefit of German patent application No. 10 2013 011 614.7, filed Jul. 12, 2013, the aforesaid German patent application and the aforesaid US patent application being incorporated in its entirety herein by reference.

TECHNICAL FIELD

The invention relates to a filter element, particularly a flat filter element, for installing in a filter housing of a filter for fluids, particularly an air filter, particularly of an internal combustion engine, particularly of a motor vehicle, with an open filter bellows made of a filter medium, which has an upstream side and an downstream side for the fluid to be filtered, and with an element axis that can be aligned parallel or axially to an installation direction for installing the filter element into the filter housing.

Furthermore, the invention relates to a filter for fluids, particularly an air filter, particularly of an internal combustion engine, particularly of a motor vehicle, with a filter housing, which has at least one inlet and at least one outlet for the fluid, and with at least one filter element, particularly a flat filter element, particularly a filter element according to the invention, with an open filter bellows made of a filter medium which has an upstream side and a downstream side for the fluid to be filtered, wherein the filter element is arranged in the filter housing in such a manner that it separates the at least one inlet from the at least one outlet, and wherein an element axis of the filter element and a housing axis of the filter housing can be aligned parallel or axially to an installation direction in the filter housing for installing the filter element.

In addition, the invention relates to a filter housing of a filter for fluids, particularly an air filter, particularly of an internal combustion engine, particularly of a motor vehicle, which has at least one inlet and at least one outlet for fluid, in which at least one filter element, particularly a filter element according to the invention, particularly a flat filter element, can be arranged in such a manner that it separates the at least one inlet from the at least one outlet, and which has a housing axis, which can be aligned parallel or axially to an installation direction of the filter element in the filter housing for installing the filter element.

BACKGROUND

A filter device with a panel filter element for filtering fresh air of an internal combustion engine of a vehicle is known from WO 2012/175438A1. The filter element has a level, flat, panel-shaped filter body, which has an edge that is arranged circumferentially and laterally as well as in a manner enclosing a flow-traversable cross-section of the filter body. The filter element is arranged in the interior space of a filter housing. The filter device is preferably an air filter device, in fact particularly of a motor vehicle in particular.

The object of the invention is to design a filter element, a filter, and a filter housing of the type mentioned in the beginning, in which installation of the filter element into the filter housing and removal out of the filter housing and/or positioning of the filter element in the filter housing can be improved. In particular, a guiding of the filter element during installation and/or during removal is to be improved, particularly simplified. In addition, the object of the invention is to expand the possibilities of adding a function element, such as a guide crosspiece in particular.

SUMMARY OF THE INVENTION

According to a first aspect of the invention, this task is solved with the filter element having a filter body of a filter media, in that the filter element has at least a guide crosspiece, which extends axially and radially outward on an external side of the filter element in a circumferential manner relative to the element axis.

According to this first aspect, at least one guide crosspiece is provided with which the filter element is guided upon installation into the filter housing and upon removal.

The extension of the at least one guide crosspiece radially outward means that the at least one guide crosspiece extends radially outward from the external side of the filter element, which is positioned radially further inside in relation to the element axis.

In doing so, the at least one guide crosspiece can extend radially outward in relation to the element axis. Alternatively or additionally, the at least one guide crosspiece can extend from radially inward to radially outward with a directional component perpendicular to the exterior side of the filter element, which does not have to necessarily run radially to the element axis.

If for the sake of a simpler description, an imaginary x-y-z coordinate system is placed in the filter element, whose z-axis is axial to the element axis, then the filter element with the at least one guide crosspiece is guided transversely to the z-axis, particularly in the direction of the x-axis and/or in the direction of the y-axis, into the filter housing.

Advantageously, the at least one guide crosspiece and/or if applicable a corresponding housing-side strip guide, in or on which the at least one guide crosspiece can be guided, can be designed in such a manner that the filter element can be guided in different directions in the x-y plane transversely to the element axis.

The at least one housing-side strip guide can be executed by means of a corresponding recess or groove in a corresponding perimeter wall of the filter housing. In this way, a positioning of the filter element in the filter housing can be simplified and improved. The at least one crosspiece guide can be designed in such a manner that it permits a positional tolerance of the filter element, particularly of the at least one guide crosspiece. Advantageously, play, particularly that exists transversely to the element axis, may be provided between the at least one guide crosspiece and the at least one crosspiece guide. Advantageously, expansion of the at least one crosspiece guide can be greater, at least in an expansion direction, particularly of an expansion direction transversely to the element axis, than a corresponding expansion of the at least one guide crosspiece.

In addition, the at least one guide crosspiece can provide the filter element with support in its operating position in the filter housing.

The guide function and if applicable the support function of the at least one guide crosspiece can advantageously be separated by a possible seal function. The seal function can be taken over by another component, particularly a seal. Thus, the support function/guide function and seal function can each be optimized separately from each other. With the at least one guide crosspiece, the possible seal can be relieved of pressure in a mechanical manner. In this way, any loads on the seal, particularly resulting from vibrations during operation of the filter, can be decreased.

Given this background and according to a second aspect of the invention, at least one seal, running peripherally in relation to the element axis, is arranged on the filter element. The seal has a seal line, which has at least one convexity that is arranged peripherally between two circumferentially consecutive corner regions of the filter element and spaced apart by these corner regions. Thanks to this convexity, there is available space on the peripheral side for a function element. In particular, the guide crosspiece, according to the first aspect of the invention, is arranged radially to the element axis inside an axial projection of the interior surface surrounded by the convexity.

Advantageously, the at least one guide crosspiece can extend axially to the element axis over a large portion of the height, particularly the total height, of the filter element, particularly of the filter bellows and/or if applicable of a corresponding end body. In this way, the guide can be guided beforehand, preferably prior to inserting the filter element into the filter housing, when installing the filter element. Thus, the installation can be simplified. In addition, for an installed filter element, a support can thus result over the entire height of the filter element. A tilting or tipping of the filter element in the filter housing both during installation as well as in the end position can thus be counteracted. In this way, relatively large, particularly voluminous and/or heavy and/or at least in one direction, particularly in the direction of the element axis, expanded filter elements can be stably and reliably guided and positioned in the filter housing. In particular, filter elements with pleated filter media, which have deep pleats and/or variable pleat heights, can thus also be reliably guided and held in the filter housing.

Furthermore, one can prevent with the at least one guide crosspiece that the filter pleat strikes the walls of the filter housing during installation. The filter bellows, particularly the filter material, can thus be protected during installation of the filter element against damage.

Advantageously, the at least one guide crosspiece can be contiguous at least when seen in the direction of the element axis. It can also have discontinuities. Advantageously, the at least one guide crosspiece can have at least one guide surface, which is oriented with at least one directional component transversely to the element axis. For the purpose of guiding the filter element, the at least one guide surface can slide transversely to the element axis on a corresponding counter-guide surface of the filter housing.

Advantageously, the at least one guide crosspiece and/or the at least one crosspiece guide on the housing side can be of plastic. Plastic can be simply treated and processed. Complex shapes can also be simply constructed of plastic. Out of plastic, one can also construct flexible, particularly elastic, components.

The at least one guide crosspiece can advantageously be connected in a material-bonded and/or form-fitting and/or force-fitting manner, particularly by means of adhering, welding and/or spraying on, casting, forming to, inserting, snapping, linking, and/or clamping, indirectly, particularly by means of an end body, or directly to the filter bellows.

Advantageously, the filter element can be suited for filtering air. It can also be provided for filtering other types of fluids, particularly gases or liquids. In this way, a corresponding filter element can be used particularly also for filtering fuel, oil, water, or a urea solution.

Advantageously, the filter element can be used in an internal combustion engine of a motor vehicle.

Advantageously, the filter element can be arranged in an air filter of a commercial motor vehicle, particularly a truck, a bus, a worksite vehicle or agricultural machine. Such filter elements can be dimensioned larger in comparison to filter elements of personal motor vehicles. However, the filter element can also be used for personal motor vehicles.

The invention can also be used outside of motor vehicle technology, particularly for industrial motors. Use of the invention outside of internal combustion engines, particularly in motor vehicle technology, is also possible.

For the filter body, in one option an open filter bellows may be involved, i.e., the filter medium is not closed into a hollow body. In contrast thereto, a hollow filter element, particularly a so-called round filter element has the filter medium peripherally closed and surrounding an interior space.

Advantageously, the filter element with the filter body may be a flat filter element. The filter element may be plane or curved. At the same time, the upstream side and/or the downstream side of the filter bellows can be plane, curved, or stepped. The filter element can also be box-shaped.

The filter body can have the form of a polyhedron for example. Advantageously, the filter body of the filter medium can be cube-shaped, cuboid-shaped, pyramidal, prismatic, wedge-like or similar. In doing so, it is not required that all sides, particularly the peripheral sides, of the filter body are plane. The sides of the filter body can also be partly curved or stepped. Opposite sides can run parallel. Alternatively or additionally, they can also run diagonally or otherwise non-parallel to each other.

Advantageously, a housing axis of the filter housing can be parallel or axial to the element axis and/or the installation direction of the filter element. A removal direction is generally opposite the installation direction. Regarding the element axis of the filter element, it may advantageously involve a central axis and/or a symmetrical axis. Advantageously, the element axis may traverse the upstream side and the downstream side of the filter element. In the event of a plane upstream side and/or a plane downstream side, the element axis and/or the installation direction may advantageously run perpendicular to it/them. A main flow direction of the fluid to be filtered through the filter body or filter bellows can advantageously run parallel or axially to the element axis and/or the installation direction.

Regarding the filter medium, it may involve a filter paper, a filter fleece, a melt-blown, a fabric, or another filter medium suited for filtering fluids, particularly air. Advantageously, the filter medium can be pleatable.

The filter body or filter bellows can alternatively also have a fluid-permeable, particularly air-permeable, filter foam. The filter bellows can be designed as a solid block of such a filter foam.

In an advantageous embodiment, the at least one guide crosspiece can taper in the direction of the element axis, particularly in the installation direction, at least in an expansion direction transversely to the element axis.

The at least one guide crosspiece can advantageously taper in its circumferential expansion relative to the element axis. Alternatively or additionally, the at least one guide crosspiece can taper in its expansion that is oriented from radially inward to radially outward relative to the element axis.

Advantageously, the at least one guide crosspiece, seen in the installation direction, can be smaller in the at least one expansion direction than in the rear. In this way, the at least one guide crosspiece can be simply inserted in a correspondingly running crosspiece guide. In this way, a ramp-like guide can be implemented.

In another advantageous embodiment, the at least one guide crosspiece, seen in the direction of the element axis, can have at least one shoulder or step.

Advantageously, the expansion of the at least one guide crosspiece in at least one expansion direction transversely to the element axis, seen in the installation direction, can be smaller before the at least one step than on and/or behind the at least one shoulder or the at least one step.

The shoulder or step can serve, during installation of the filter element, as a type of limit stop on a corresponding counter-surface, particularly a shoulder, of the filter housing. The filter element can, in its position on the at least one shoulder or the at least one step, lie on the corresponding counter-surface of the filter housing. In this way, the filter element can be positioned axially, relative to the element axis, in the filter housing. In this way, any seal of the filter element can also be positioned precisely in the filter housing.

In another advantageous embodiment, a position of an at least one section, particularly of a spring arm, of the at least one guide crosspiece can be modifiable, particularly in an elastic manner, relative to the filter bellows.

Changing the position of the at least one section can be performed by deformation and/or by moving the at least one section.

Advantageously, the at least one modifiable section of the at least one guide crosspiece is movable at least with a directional component transversely to the element axis.

Advantageously, the guide crosspiece can have a springy section, particularly a springy flange or spring arm.

Advantageously, the modifiable section can be located in the region of a front end of the guide crosspiece when viewed in the installation direction.

Advantageously, the modifiable section can interact with a corresponding counter-section of the filter housing, particularly of the crosspiece guide if applicable. By means of the modifiable section, a position tolerance of the filter element in the filter housing can be compensated for. A guide and/or support transverse to the element axis can thus be improved. In addition, vibration damping can thus be executed in a simple manner. In an end position of the filter element, the modifiable section can, under mechanical tension, abut the filter housing, particularly the crosspiece guide.

Advantageously, at least one elastic element can be arranged between the at least one modifiable, in particular elastically springy, section and the filter bellows, particularly the end body. With the elastic element, an elastic mechanical tension of the modifiable section can be improved.

The at least one modifiable section of the at least one guide crosspiece and/or the at least one elastic element can advantageously have or consist of an elastic material, particularly elastic plastic, particularly an elastomer, preferably polyurethane. With plastic, one can execute in a simple manner elastically springy properties and/or shapes in particular. An elastomer, particularly polyurethane, has elastic properties. It lends itself particularly for executing the elastic element.

The at least one modifiable section and/or the at least one elastic element can advantageously, particularly in a one-piece manner, be connected to the at least one guide crosspiece and/or if applicable with the end body.

The at least one modifiable section and/or the at least one elastic element can be injection-molded or cast advantageously on the at least one guide crosspiece and/or if applicable the end body. They can also be connected in another way in a material-bonded and/or form-fitting and/or force-fitting manner to the at least one guide crosspiece and/or the at least one end body.

In another advantageous embodiment, the filter element can have at least two guide crosspieces, which can be spaced apart peripherally relative to the element axis. Preferably, the guide crosspieces are each arranged radially to the element axis within an axial projection of the interior surface surrounded by a respective convexity.

In this way, the filter element can be guided and/or positioned at various places. The filter element can thus be guided and/or positioned more evenly in the filter housing. The risk of tilting the filter element during installation or removal can thus be decreased. Thus, relatively heavy and/or large filter elements can be placed and held in a simple and precise manner in the filter housing.

Advantageously, at least two guide crosspieces can be arranged on the sides, opposite a plane which contains the element axis, particularly peripheral sides, of the filter element. In this way, the filter element can be guided and/or positioned evenly on opposite sides.

Advantageously, at least four guide crosspieces can be arranged distributed on the filter element in a peripheral manner relative to the element axis.

Advantageously, two each of the guide crosspieces can be arranged in pairs.

In another advantageous embodiment, at least two guide crosspieces can be asymmetrical, in the sense of an axis symmetry, relative to the element axis, particularly relative to a symmetry axis of the filter element, with at least one end body if applicable.

In this way, one can prevent that a wrong filter element is installed or that the filter element is installed incorrectly in the filter housing. Thus, particularly a so-called blind installation can be simplified, in which the correct orientation of the filter element in the filter housing can be easily detected during installation.

Advantageously, the at least two guide crosspieces can have different shapes, expansions, and/or courses to execute the asymmetry. Alternatively or additionally, the at least two guide crosspieces may be arranged advantageously in asymmetric manner relative to the element axis.

In another advantageous embodiment, the filter medium can be pleated.

By pleating the filter medium, the ratio between the active filter surface and the structural volume of the filter bellows can be improved.

The filter medium can be pleated in a zigzag-shaped to the filter bellows. For filter elements, particularly flat filter elements, with an open filter bellows, the filter media are not closed, i.e., the front pleats just like front edges are not connected to each other. In contrast thereto, for hollow filter elements, particularly round filter elements, the filter media are formed into a closed filter bellows, i.e., their front pleats are connected to each other. The front pleats are the tow external pleats, on opposite front sides, particularly longitudinal sides, of the filter bellows. Front edges are the two free edges of the filter medium, which run along the front pleats and border these on the front sides of the filter bellows. The front edges of the filter bellows are the two other free edges of the filter bellows, which extend between the front edges and run corresponding to the pleat of the filter bellows. The pleat edges are the edges, along which the filter medium is pleated. In a zigzag-shaped, pleated, cuboid-shaped filter bellows, the front edge and the pleat edge are straight and run parallel to each other. The front edges run in a zigzag shape and perpendicular to the front borders and the pleat edges. The front edges each span a front edge side of the filter bellows. In the pleated filter medium, the upstream side of the filter bellows is stretched by the upstream-side pleat edges of the filter bellows. The downstream side is stretched by the downstream-side pleat edges of the filter bellows.

Advantageously, the filter bellows can have deep pleats. In an approximately cuboid-shaped filter bellows, one speaks particularly of deep pleats, when a pleat-height is about as great as the expansion in the direction of the pleat edges and/or in the direction transversely to the pleat edges.

Advantageously, the at least one support crosspiece can extend parallel to a pleat height of the pleats of the filter medium. Advantageously, the at least one support crosspiece can extend perpendicular to the pleat edges. Advantageously, the pleat edges of the filter medium at least on one side of the filter bellows, particularly on the upstream side, can run perpendicular to the element axis.

In another advantageous embodiment, an axial height, particularly pleat height, relative to the element axis, of the filter bellows can vary.

Advantageously, varying pleat courses can also be provided within the filter bellows. In doing so, the pleat height and/or pleat courses can vary within at least one of the pleats. Alternatively or additionally, the pleat heights and/or pleat courses can also vary between the pleats, particularly adjoining pleats. In this way, a curved course of the upstream side and/or the downstream side can be executed. In particular, the pleat heights in the center of the filter bellows can be smaller or larger than in the region of the longitudinal sides, particularly of the front pleats. Alternatively, the filter bellows can also be stepped by corresponding variations in the pleat height. In this way, the filter bellows in the region of the front sides, particularly the front pleats, can be of differing heights.

Advantageously, the filter element, on a side, particularly the downstream side, can be plane, curved, in particular circularly cylindrical or ovally cylindrical or similarly curved, and/or stepped.

In another advantageous embodiment, an end body, particularly an end plate, can be arranged on at least one peripheral side of the filter bellows, which extends between the upstream side and downstream side.

With the at least one end body, the filter bellows and the entire filter element can be stabilized. Furthermore, the filter bellows with the at least one end body can be sealed in a particularly tight manner to the corresponding side. In addition, the at least one end body can serve as a connecting element and/or retaining element with which the filter element can be guided, positioned, and/or retained in a more stable manner.

Advantageously, corresponding end bodies can be arranged at multiple peripheral sides of the filter bellows. Thus, the stability of the filter element can be further improved. The at least one end body can extend also across multiple peripheral sides, particularly the entire circumference, of the filter bellows.

Advantageously, an end body can be arranged on the opposite peripheral sides of the filter bellows. The end bodies can be located advantageously on opposite sides of the filter bellows sides relative to the installation direction of the filter element and/or the element axis.

Given a pleated filter medium, the at least one end body can be located on a front edge side of the filter body or filter bellows. The at least one end body can be tightly connected to the front edge side. In this way, the at least one end body can tightly seal off the front edge side of the filter body or filter bellows.

Advantageously, both front edge sides of the filter body or filter bellows can each be sealed with an end body.

The at least one end body can advantageously be an end plate. An end plate is flat in an expansion direction relative to the other expansion directions. In this way, the structural space requirement of the end body and thus also the filter can be decreased overall.

The at least one end body can be furnished with a rib structure, with which the stability of the end body can be augmented.

The at least one end body can advantageously be made of plastic or have plastic.

The at least one end body, particularly out of plastic, can have a damping effect, particularly a mechanical one. Furthermore, plastic can be simply formed, particularly cast or injection-molded. With an end body out of or with plastic, the movability, particularly the flexibility, of the support can be further improved.

The at least one end body, particularly the end body of plastic, can be connected to the filter body or filter bellows advantageously in a material-bonded, form-fitting and/or force-fitting matter, particularly by means of welding, adhering, molding, casting, injecting, a plug connection, a snap-lock connection, a press-fit connection and/or a clamp connection or in another way.

In another advantageous embodiment, the at least one guide crosspiece can be connected to the at least one end body, particularly in a one-piece manner. In this way, the at least one guide crosspiece can be manufactured, particularly pre-manufactured, jointly with the corresponding end body in a simple manner. The at least one end body with the at least one guide crosspiece can simply be connected to the filter medium, particularly the filter bellows. This can occur advantageously in a task step.

Advantageously, the at least one guide crosspiece and the at least one end body can be connected to each other in a one-piece manner. With a one-piece connection, the stability can be increased. One can omit additional attachment elements and/or additional installation steps for connecting the at least one guide crosspiece to the at least one end body.

Advantageously, the at least one end body with the at least one guide crosspiece can be injection-molded or cast simply out of plastic.

Instead of being one piece, the at least one guide crosspiece can alternatively also be connected as a separate component or to a separate component directly or indirectly to the end body. The separate component can advantageously be connected to the at least one end body. Alternatively, the separate component can be connected directly to the filter body or filter bellows.

In another advantageous embodiment, the filter element can have at least a filter element retention device that can be connected directly or indirectly to the filter bellows, which can extend between the upstream side and the downstream side along at least one portion of a circumference of the filter body or filter bellows, and which can have at least one retention arrangement sticking out from the filter bellows transversely to the element axis from radially inward to radially outward.

With the at least one filter element retention device, the filter element can be simply held in a corresponding counter-retention direction of the filter housing. In this way, the filter element can be positioned in the filter housing in a simple manner. Because the filter element retention device extends at least along a portion of the circumference and has retention arrangements sticking out radially to the element axis, particularly the installation direction, an axial positioning and mounting, relative to the installation direction and/or the element axis, in the filter housing can result.

Advantageously, the filter element can have at least an axial retention surface. The axial retention surface can be oriented at least with a directional component axially to the element axis of the filter element. The at least one axial retention surface can abut a corresponding axial counter-surface of the filter housing for holding the filter element axially to the element axis. Advantageously, the filter housing can have the counter-retention device with which the filter element retention device can interact. The counter-retention device can have at least a retention mount, particularly a recess, which can accommodate at least a retention arrangement of the filter element retention device. The counter-retention device can advantageously be executed in connection with connecting flanges of the filter housing to connect a housing case to a housing cover.

Advantageously on the element side, an axial distance, relative to the element axis, between the filter element retention device and a side, particularly the downstream side, of the filter element, which faces at least a through-passage, particularly an outlet, of the filter housing, can be smaller than, an axial distance between the counter-retention device and the at least one through-passage on the housing side. In this way, one can avoid that the filter element covers the at least one through-passage and thus disturbs a fluid flow.

Advantageously, the at least one filter element retention device can be located in the vicinity of a rear, in relation to the installation direction, side of the filter element. Advantageously, the rear side of the filter element can be the upstream side.

Advantageously, the at least one filter element retention device can be connected to the possibly at least one end body. In this way, a force transfer from the filter housing to the filter bellows and vice versa can be improved.

In another advantageous embodiment, the at least one guide crosspiece can lie within an imaginary cylinder, whose axis runs parallel or axially to the element axis and can define its radially external peripheral side by means of an external circumference of the filter element, viewed in the direction of the element axis, at the level of the filter element retention device.

In this way, one can avoid that the at least one guide crosspiece projects transversely to the element axis, in other words in the direction of the x-axis and/or the y-axis, in the filter element retention direction. One can thus achieve that the lateral expansion of the filter element is not further enlarged by the at least one guide crosspiece.

The at least one guide crosspiece can advantageously be arranged in a region of the filter element, in which the filter element is already expanded laterally, particularly transversely to the installation direction and the element axis respectively, due to the filter element retention device. The filter element retention device thus defines the widest point of the filter element. Correspondingly, the counter-retention device defines the widest point of the filter housing. When installing the filter element, the at least one guide crosspiece can be inserted unimpeded in narrower regions behind the counter-retention device.

Advantageously, the at least one guide crosspiece can align, viewed in the direction of the element axis, with at least one retention arrangement. "Align" in the sense of the invention means that a projection of the at least one guide crosspiece in the direction of the element axis is located at least partially, preferably completely, within the retention arrangement of the filter element retention device or vice versa.

In another advantageous embodiment, at least one seal running peripherally relative to the element axis can be arranged on the filter element.

The seal can project advantageously past the filter bellows on at least one radially external peripheral side, relative to the element axis.

Advantageously, the seal can be peripherally closed.

According to the second aspect of the invention, the seal can surround, in a radially external manner relative to the element axis, the at least one guide crosspiece. In the region of the guide crosspiece, a course of the at least one seal can be advantageously adapted to a peripheral course of the guide crosspiece.

The seal can be positioned, if applicable, to or on at least one of the retention arrangements. Advantageously, the seal can be positioned to or on the filter element retention device if applicable. The seal can also advantageously help form the filter element retention device.

Particularly for an arrangement of the at least one retention arrangement of the filter element retention device in the region of the front side on the at least one end body, the seal line of the seal can advantageously run externally around the at least one retention arrangement and the at least one guide crosspiece in a radial manner relative to the element axis. According to the second aspect of the invention, convexities result which, when viewed in the direction of the element axis, correspond to the position of the at least one retention arrangement and/or the at least one guide crosspiece. Advantageously, these convexities can simultaneously also surround the at least one retention arrangement and/or the at least one guide crosspiece.

Advantageously, the at least one seal and/or the filter element retention device can be arranged in the vicinity of the upstream side. In this way, a majority of the at least one guide crosspiece can be located on the clean side of the filter element. The filter housing, particularly the counter-retention device if applicable, can advantageously have a seal section for accommodating the seal. A peripheral course of the seal section can correspond to the course of the seal. In particular, the seal section can have at least one recess for accommodating at least one seal section sticking out radially, which if applicable surrounds at least one support crosspiece. The housing-side seal section can advantageously be executed in conjunction with the connection flange(s) of the housing case and/or the housing cover.

Advantageously, the at least one seal can act in a sealing manner in an axial direction relative to the element axis. This means that the seal has at least one axial seal surface that is oriented at least with a directional component parallel to the element axis. The axial seal surface can advantageously interact with a corresponding axial seal surface of the filter housing, which is also oriented at least with a directional component parallel to the element axis. Alternatively or additionally, the seal can also act in a sealing manner in a radial direction.

In another advantageous embodiment, the filter element can have at least one grip element at which the filter element can be held particularly for installation or removal purposes.

At the at least one grip element, the filter element can be held in a simple manner. In this way, contamination of and/or damage to the filter element, particularly the filter body or filter bellows, can be avoided during installation. In addition, the filter element can thus be installed in and removed from the filter housing in a simpler manner. Thus, the filter element can be removed from the filter housing in a simpler manner when the filter bellows is arranged deeply in the housing case.

The at least one grip element can advantageously be connected to the filter body or filter bellows, particularly to the at least one end body. The at least one grip element can advantageously be connected in a one-piece manner to the at least one end body.

The at least one grip element can advantageously be connected to the at least one filter element retention device and/or at least help form these. In this way, the at least one grip element can also act as a grip element for holding the filter element in the filter housing. Thus, a positioning of the filter element in the filter housing can be further improved. A possible seal can in this way also be relieved of a force in a mechanical manner. With the at least one grip element, an additional latching between the filter element in the filter housing can occur. In this way, various orientations of the filter element can be executed in the space. A so-called hanging filter system can thus also be executed in a simple manner, in which a so-called overhead assembly of the filter element results. A hanging filter system has the advantage that when opening the filter housing for maintenance purposes, any residual dirt can fall out downward from the filter case. This is a major advantage particularly when using the air filter in a commercial vehicle. The filter element can thus also be arranged diagonally or with a gradient.

A contour of the at least one grip element can fit together with a corresponding counter-contour of the filter housing, particularly a housing cover.

Advantageously, the filter housing, particularly the housing cover, can have at least a through-opening in an outward direction, through which the at least one grip element can project. In this way, the at least one grip element can be detected from the outside when the filter housing is assembled. One can thus identify whether the correct filter element is correctly installed in the filter housing.

Furthermore, the task is solved according to the invention with the filter, in that the filter element has at least one guide crosspiece that extends axially and radially outward along a peripheral, relative to the element axis, exterior side of the filter element, and the filter housing has at least one crosspiece guide for the at least one guide crosspiece, said crosspiece guide extending axially and radially outward on a peripheral, relative to the housing axis, interior side of the filter housing.

The advantages and features described above in relation to the filter element according to the invention and its advantageous embodiments apply to the filter according to the invention and vice versa.

In addition, the task is solved according to the invention with the filter housing in that the filter housing has at least one crosspiece guide for at least one guide crosspiece of the filter element, said crosspiece guide extending axially and radially outward on a peripheral, relative to the housing axis, interior side of the filter housing.

The advantages and features described above in relation to the filter element according to the invention and the filter according to the invention and their advantageous embodiments apply to the filter housing according to the invention and vice versa.

BRIEF DESCRIPTION OF THE DRAWINGS

Additional advantages, features, and details of the invention emerge from the following description, in which embodiments of the invention are explained in further detail by means of the drawings. A person skilled in the art will also necessarily view the features, disclosed in a combined manner in the drawing, the description, and the claims, individually and merge them into reasonable other combinations. Depicted schematically in various illustrations and detail views are the following drawings.

FIGS. 1 to 9 depict an example air filter with an air filter element, which has guide crosspieces for guiding the air filter element during installation into an air filter housing according to a first embodiment;

FIGS. 10 to 12 depict an air filter according to a second embodiment;

FIGS. 13 to 19 depict an air filter according to a third embodiment;

FIGS. 27 to 28 depict an air filter according to a fifth embodiment;

FIGS. 32 to 36 depict an air filter according to a seventh embodiment;

Figure 1:
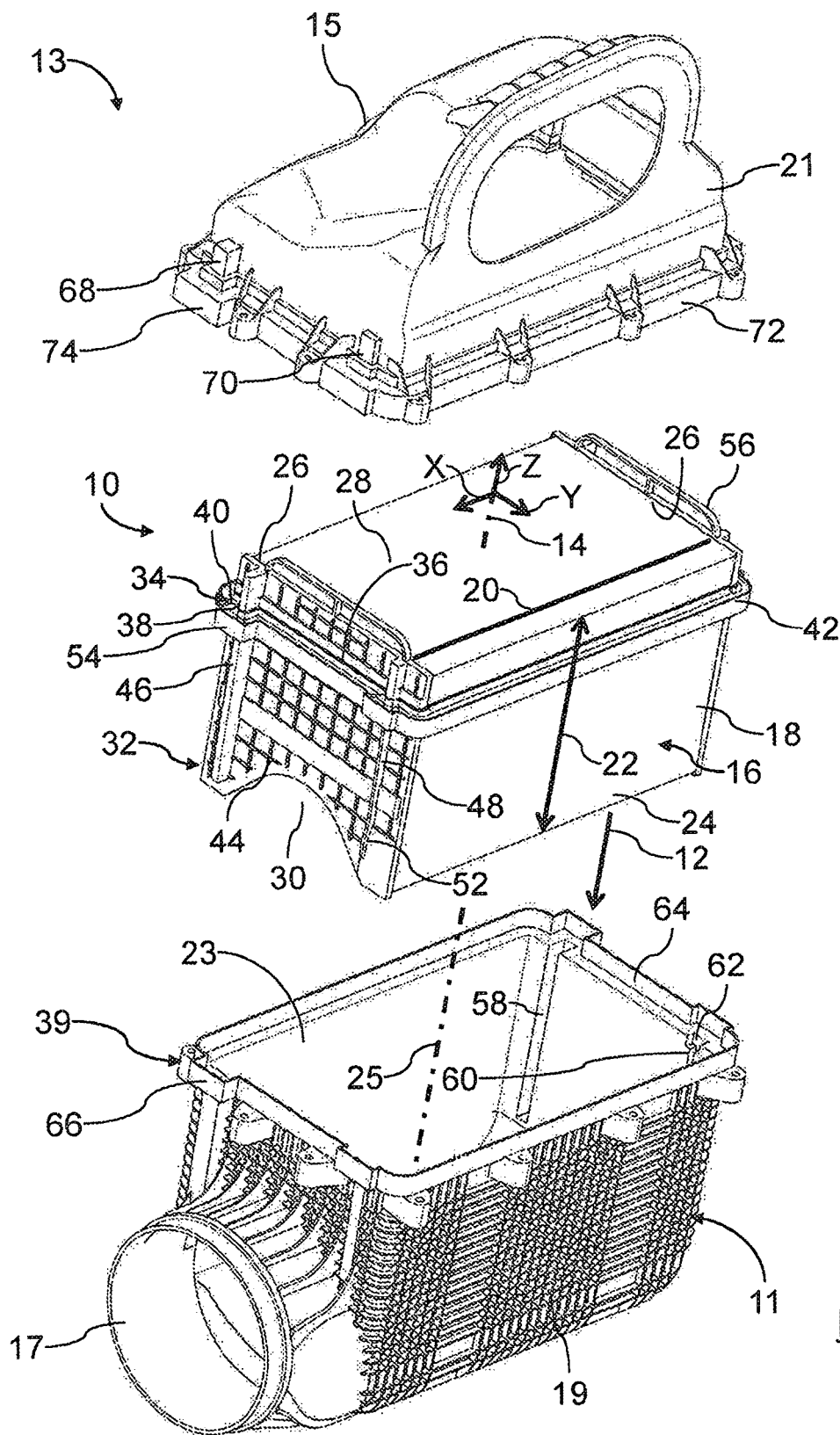
Figure 3:
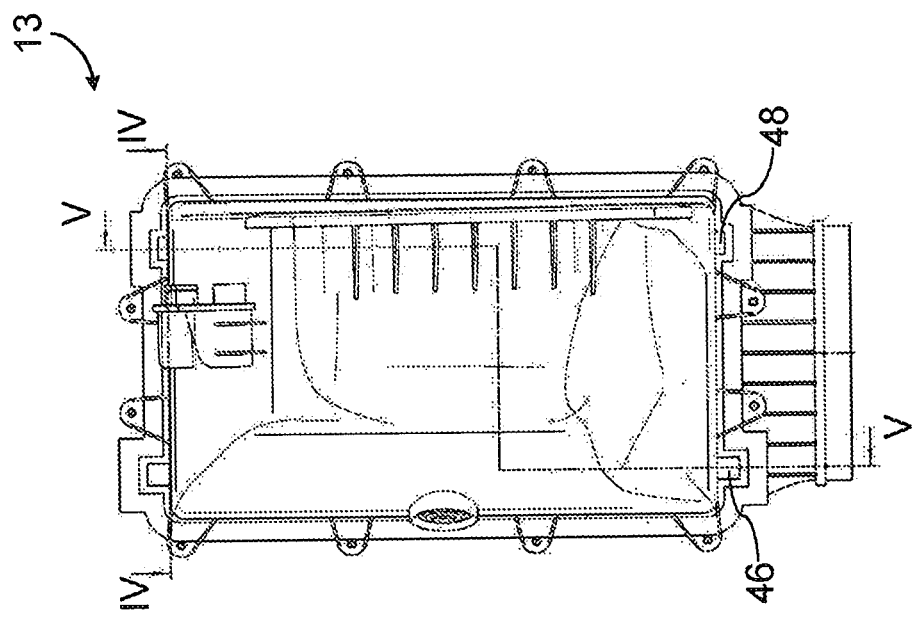
Figure 2:
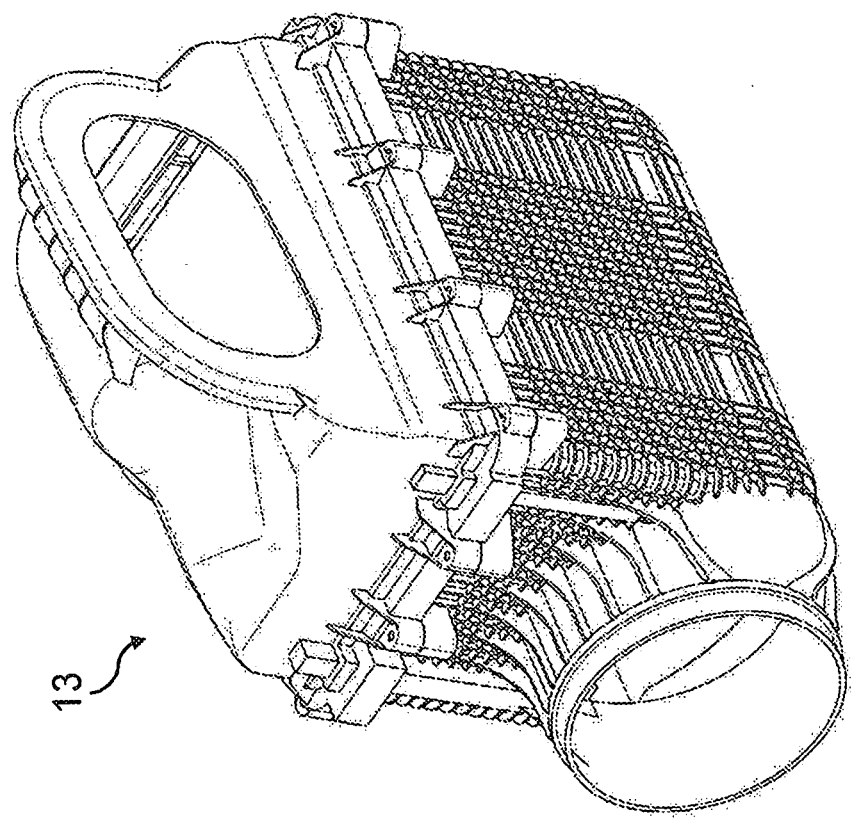
Figure 13:
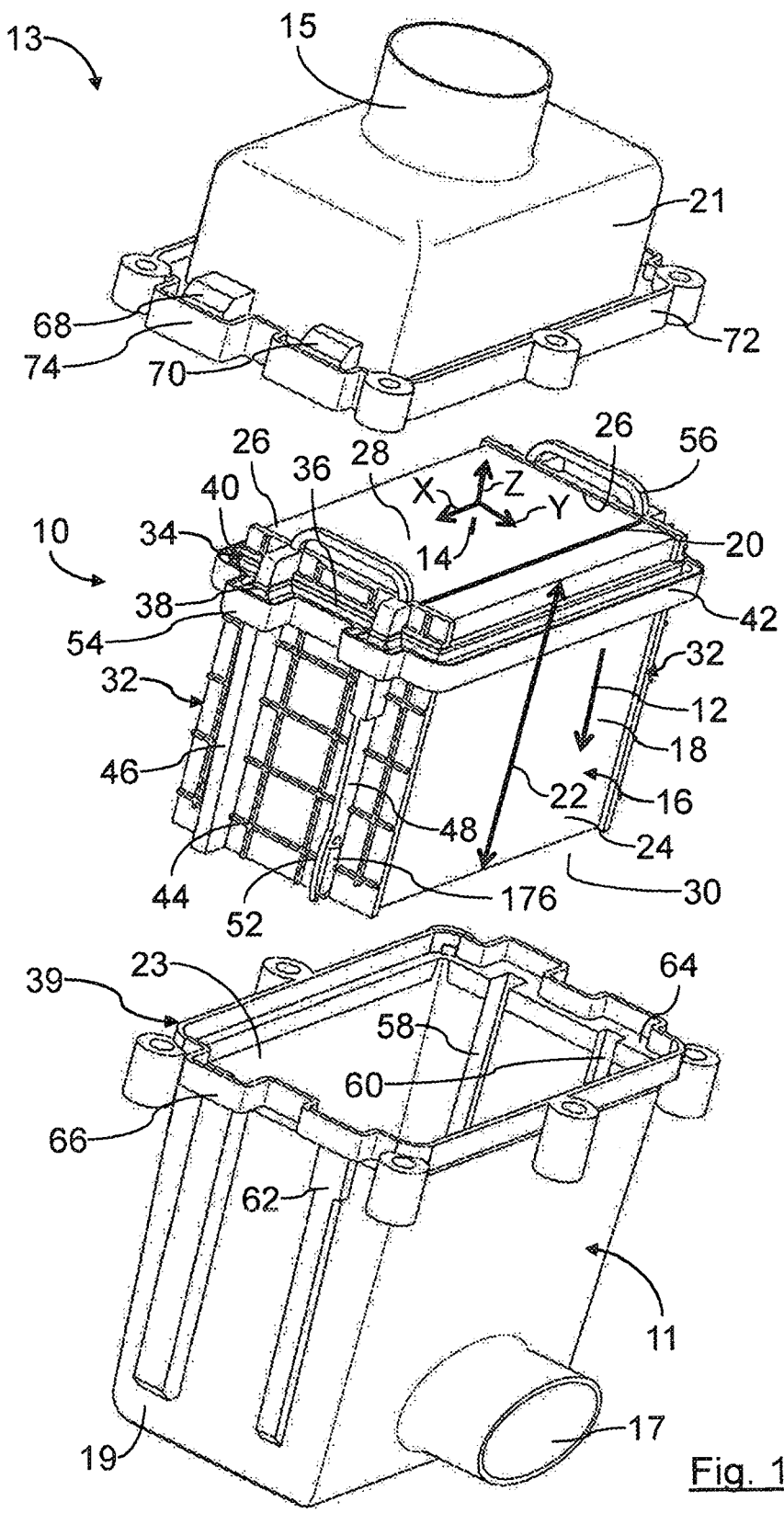
Figure 15:
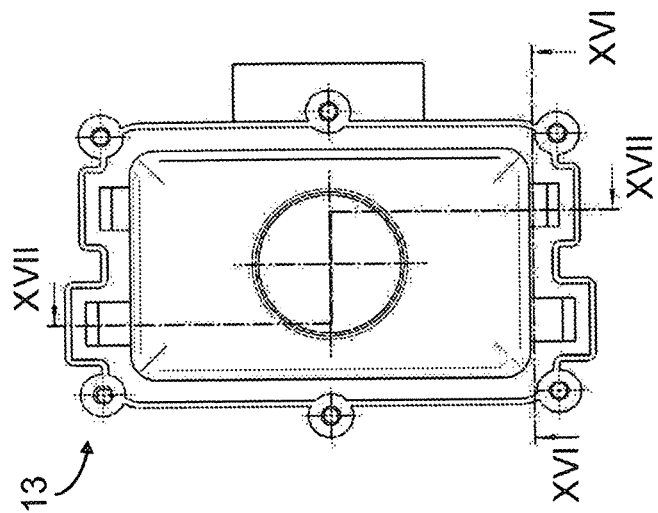
Figure 16:
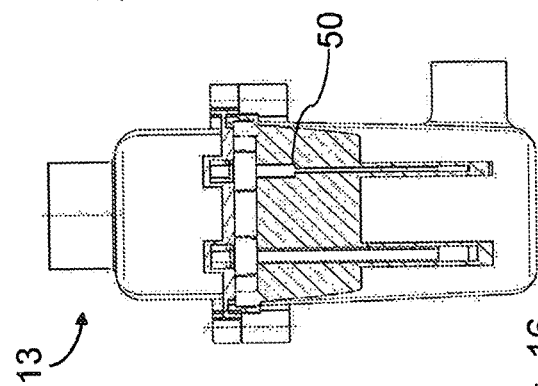
Figure 14:
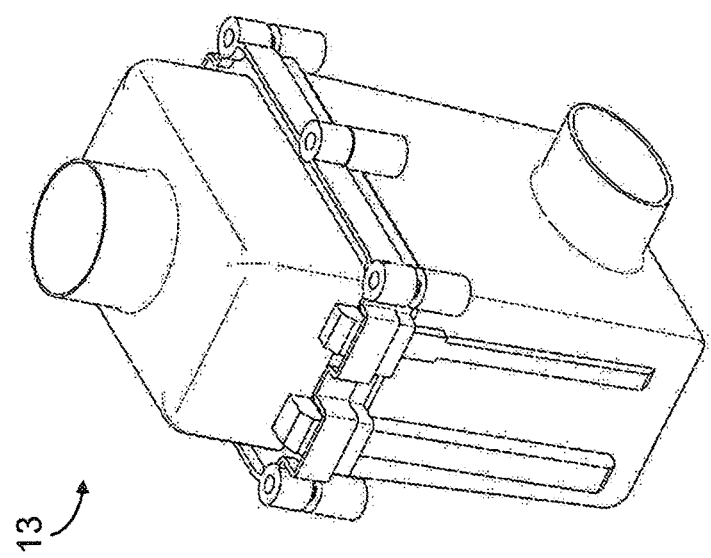
Figure 20:
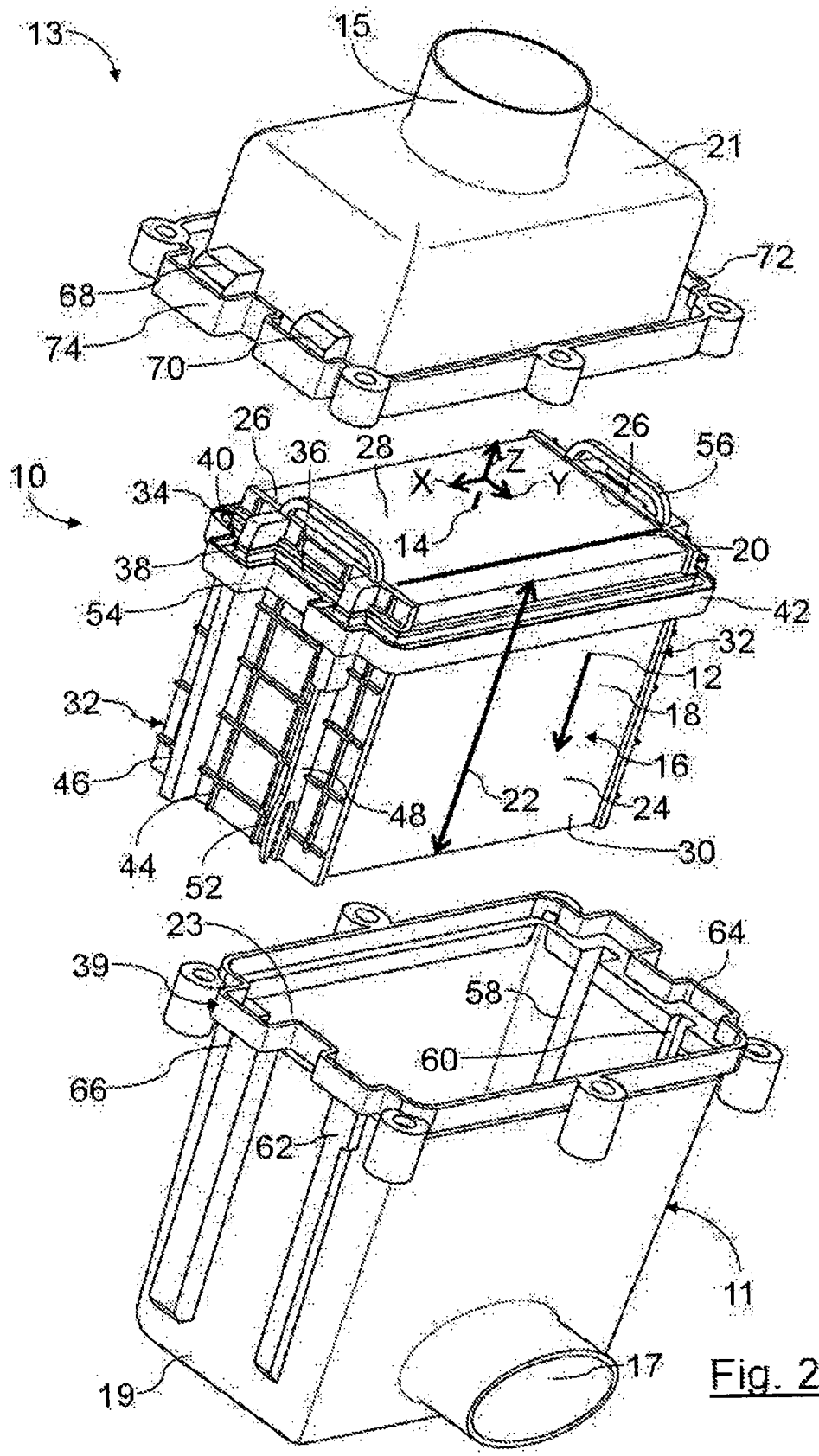
FIGS. 20 to 26 depict an air filter according to a fourth embodiment.
Figure 22:
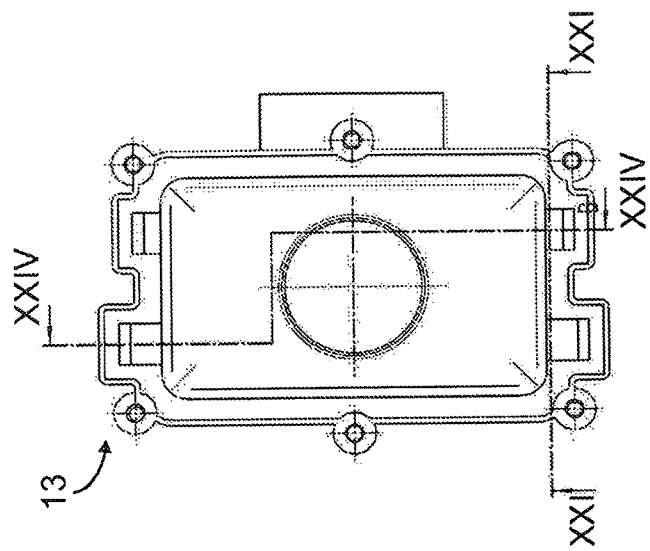
Figure 23:
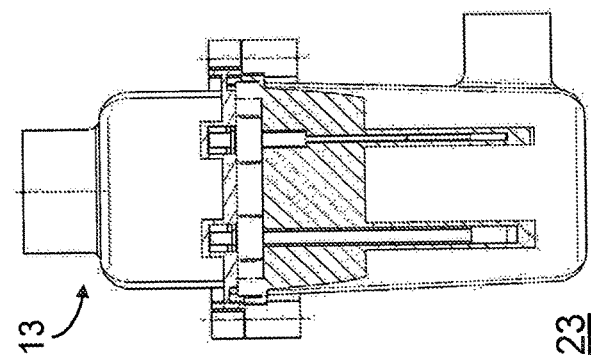
Figure 21:
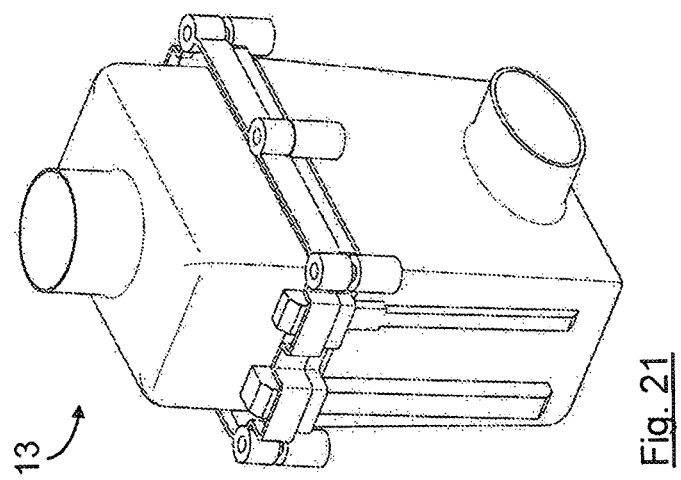
Figure 26:
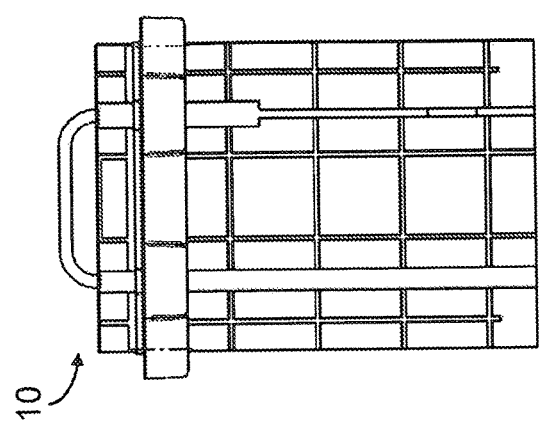
Figure 25:
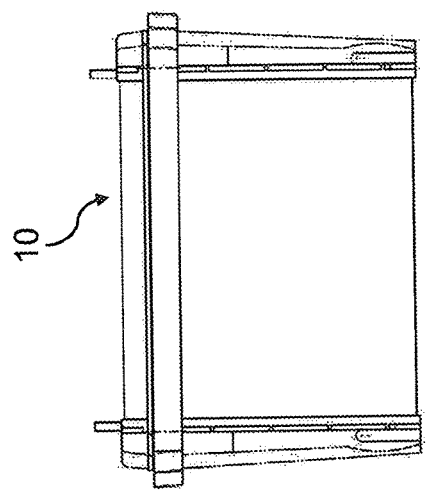
Figure 24:
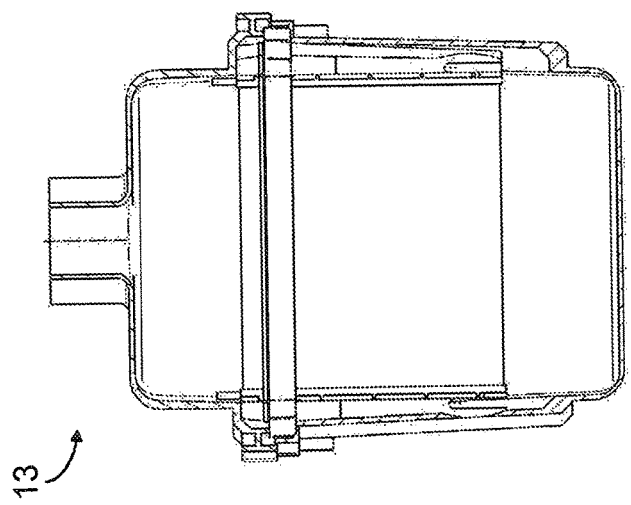

In the drawings, identical components are furnished with the same reference signs.

DETAILED DESCRIPTION OF THE INVENTION

FIGS. 1 to 5 depict an air filter 13 of an internal combustion engine of a motor vehicle according to a first embodiment in various illustrations. Air filter 13 comprises a filter element 10, which is replaceably arranged in an openable filter housing 11 in such a manner that it separates an air inlet 15 of filter housing 11 from an air outlet 17. Filter element 10 alone is depicted in FIGS. 6 to 9 in various perspectives. Filter housing 11 is composed of a housing case 19 and a housing cover 21. Housing case 19 has air outlet 17. Housing cover 21 comprises air inlet 15. Air filter 13 serves to filter combustion air, which is supplied to operate the internal combustion engine.

In the depicted embodiment, an installation direction 12 of filter element 10 in housing case 19 runs parallel to an element axis 14. For an assembled air filter 13, a housing axis 25 of filter housing 11 runs coaxially to element axis 14. Element axis 14 runs parallel for example to a z-axis of an x-y-z coordinate system, which is depicted in FIG. 1 for the purpose of simplifying the description.

Filter element 10 can be inserted through an installation opening 23 into housing case 19.

Filter element 10 is configured as a flat filter element. The illustrated filter element 10 has a filter body that is embodied as a filter bellows 16, and is approximately cuboid-shaped from the outside, of a filter medium 18 pleated in a zigzag shape. Filter medium 18 may be filter paper, filter fleece or another pleatable filter medium suited for filtering air. Filter bellows 16 may also be made of a non-pleated filter medium, for example a filter foam. Filter medium 18 is pleated along pleat edges 20. Pleat edges 20 run parallel to each other and perpendicular to element axis 14. Pleat edges 20 run for example parallel to an x-axis of the x-y-z coordinate system. FIG. 1 at the top depicts for example purposes one of the upstream-side pleat edges 20. Pleat heights 22 of pleated filter medium 18 extend parallel to element axis 14, in other words in the direction of the z-axis. A maximum axial height, relative to element axis 14, of filter bellows 16 in the direction of the z-axis is greater than the width of filter bellows 16 in the direction of the y-axis. Therefore, the pleats can be described as deep.

Pleat heights 22 of the pleats vary from pleat to pleat in the direction of the y-axis, in other words perpendicular to pleat edges 20 and perpendicular to element axis 18. Pleat heights 22 of the pleats in the center of filter bellows 16 are smaller than pleat heights 22 of the external pleats on longitudinal sides 24 of filter bellows 16. Longitudinal sides 24 are formed by the front pleats of filter bellows 16. The course of a curve through downstream pleat edges 20, in FIG. 1 at bottom, in the y-z plane correspond approximately to the course of a parabola.

Front edge sides 26 of filter bellows 16 are stretched by front edges, which are covered in the drawings, of filter medium 18. The front edges of filter medium 18 have an approximately zigzag-shaped course. Front edge sides 26 are located on radially opposite sides relative to element axis 14. Front edge sides 26 run parallel to each other and perpendicular to an upstream side 28 and a downstream side 30. Upstream side 28 and downstream side 30 are each stretched by element axis 14 and upstream-side and downstream-side pleat edges 20 respectively. Front edge sides 26 connect the two opposite longitudinal sides 24, parallel to the x-z-plane, of filter bellows 16 and form with it the circumference of filter bellows 16.

Upstream side 28, at the top of FIG. 1, is located, in an installed filter element 10, on the side facing housing cover 21.

Downstream side 30, at the bottom of FIG. 1, is located on the side facing a case bottom of housing case 19.

When operating filter element 10, filter bellows 16 is traversed according to the present embodiment by air from upstream side 28 to downstream side 30. In the present example, a main flow direction of air through filter bellows 16 thus runs parallel to installation direction 12 and element axis 14. Filter bellows 16 can also be traversed in a reverse direction. In this case, the labels "upstream side" and "downstream side" change correspondingly.

On front edge sides 26 of filter bellows 16, an end plate 32 each is tightly connected to the front edges of filter medium 18. End plates 32 each consist of plastic. End plates 32 are approximately rectangular on the outside. Their lower, downstream-side edges facing downstream side 28 run approximately parabola-shaped corresponding to downstream side 28. When filter element 10 is installed, the downstream-side edges of end plate 32 and downstream side 28 are located on the side facing housing cover 21 above air outlet 17.

In the vicinity of their upstream-side edge, each end plate 32 has a filter element retaining device 34. Filter element retaining device 34 comprises a one-piece protrusion 36. Protrusion 36 extends peripherally relative to element axis 14. It extends in the direction of pleat edges 20 from filter bellows 16, seen from the outside, and approximately parallel to the upstream-side edge of end plates 32.

In the region of their ends, which each face longitudinal sides 24, protrusions 36 each have a retention arrangement 38 sticking out, when seen from filter bellows 16. Retention arrangements 38 each have on their side facing upstream side 28 and their side facing downstream side 30, a retention surface 40. Retention surfaces 40 each extend approximately parallel to the x-y-plane. Retention surfaces 40 are oriented essentially parallel to the z-axis, in other words to element axis 14.

By means of filter element retention device 34, filter element 10 can be held in filter housing 11 in an axial manner relative to installation direction 12 and element axis 14. To this end, filter housing 11 has a corresponding counter-retention device 39 for filter element retention device 34.

A seal 42, which is configured as a profile seal, surrounds filter bellows 16 and end plates 32 or more precisely protrusions 36 and retaining arrangements 38, in a closed peripheral manner relative to element axis 14. It is located on upstream side 28, seen from the outside, somewhat behind upstream side pleat edges 20.

Furthermore, end plates 32 are each furnished on their exterior sides facing away from filter bellows 16 with reinforcing ribs 44, which run in a grid-like manner.

Filter element 10 has two high guide crosspieces 46 and two low guide crosspieces 48. At each front edge side 26, there is one of the high guide crosspieces 46 and one of the low guide crosspieces 48. Guide crosspieces 46 and 48 are each connected in a one-piece manner with corresponding end plate 32.

Guide crosspieces 46 and 48 each extend axially and radially outward along the corresponding front edge side 26 relative to element axis 14.

Guide crosspieces 46 and 48 are located spaced apart from each other beside one of the longitudinal sides 24. High guide crosspieces 46 are arranged opposite to each other and spaced apart relative to the y-z-plane. Similarly, the two lower guide crosspieces 48 are arranged opposite to each other and spaced apart relative to the y-z-plane.

High guide crosspieces 46 are each arranged opposite the corresponding low guide crosspiece 48, relative to the y-z-plane, on the same front edge side 46.

The heights of the high guide crosspieces 46 in the direction of the x-axis are greater than the heights of the low guide crosspieces 48. The heights of guide crosspieces 46 and 48 each decrease in the direction of element axis 14 from upstream side 28 to downstream side 30.

Low guide crosspieces 48 each have in the vicinity of upstream side 28 a step 50 depicted in particular in FIGS. 4 and 7. On the upstream side of step 50, a width of the low guide crosspieces 48 is greater in the direction of the y-axis than on the downstream side of step 50. Steps 50 are located on the downstream side directly behind filter element retention device 34.

All in all, the four guide crosspieces 46 and 48 are asymmetric, in the sense of an axis symmetry, relative to element axis 14.

On its downstream-side ends, low guide crosspieces 48 each have a spring arm 52. Spring arms 52 each extend approximately parallel to the z-axis. With their free ends, they point to the downstream side 30. Spring arms 52 are slightly bent outwardly in the direction of the x-axis away from filter bellows 16. Spring arms 52 are each elastically bendable in the direction of the x-axis. Thus, the positions of the free ends of spring arms 52 can be changed elastically relative to filter bellows 16.

Guide crosspieces 46 and 48 lie within an imaginary cylinder, whose axis runs parallel or axially to element axis 14 and whose radially outward peripheral side is defined by the outer circumference of filter element 10 in the direction of element axis 14, seen at the level of filter element retention device 34. All in all, guide crosspieces 46 and 48 each project past filter element retention device 34 in the direction of the x-axis.

Seal 42 surrounds guide crosspieces 46 and 48. In the region of guide crosspieces 46 and 48, seal 42 has corresponding convexities 54, which extend radially outward relative to element axis 14. Convexities 54 are each arranged between two corner regions of filter element 10 and spaced apart by it. In particular, the seal line runs between a corner region and convexity 54 arranged in its vicinity in a straight line at least over a short distance.

Filter element 10 also has two grip elements 56. Grip elements 56 are each connected in a one-piece manner next to upstream side 28 to the upstream edge of the corresponding end plate 32. Grip elements 56 are located on opposite sides of the y-z-plane. The filter element can be grasped at grip elements 56 for installation or removal purposes.

Housing case 19 has two case-side high guide grooves 58 and two case-side low guide grooves 60. Guide grooves 58 and 60 are each arranged in a manner fitting the corresponding high guide crosspieces 46 and low guide crosspieces 48 on the radially inner peripheral side, relative to housing axis 25, of housing case 19. The expansions of guide grooves 58 and 60 in the direction of the x-axis and in the direction of the y-axis are somewhat larger than the expansions of the corresponding guide crosspieces 46 and 48. In this way, guide crosspieces 46 and 48 can be guided with little play in a position-tolerant manner into guide grooves 58 and 60. The expansion of guide grooves 58 and 60 in the direction of the z-axis is greater than the expansion of the corresponding guide crosspieces 46 and 48.

Low guide grooves 60 each have on their side facing housing cover 21 a shoulder 62 on which step 50 of the corresponding low guide crosspieces 48 can abut.

A case-side connecting flange 64 of housing case 19 surrounds installation opening 23 peripherally relative to element axis 14. The case-side connecting flange 64 is open on its side facing housing cover 21. It forms a case-side part of counter-retention device 39. The case-side connecting flange 64 has corresponding convexities 66 to accommodate retention arrangements 38 and the corresponding convexities 54 accommodate seal 42.

Housing cover 21 has two cover-side high guide grooves 68 and two cover-side low guide grooves 70, which are each located in an assembled filter housing 11 in an extension of the corresponding case-side guide grooves 58 and 60. The cover-side guide grooves 68 and 70 fit sections of guide crosspieces 46 and 48, which are located on the upstream side of filter element retention device 34.

A cover-side connecting flange 72 of housing cover 21 is open on its side facing housing case 19. It forms a cover-side part of counter-retention device 39. The cover-side connecting flange 72 has corresponding convexities 74 to accommodate retention arrangements 54 and the corresponding convexities accommodate seal 42.

To install filter housing 11, filter element 10 is inserted into housing case 19 with the downstream side 30 first through installation opening 23. From the start, guide crosspieces 46 and 48 are guided into the corresponding case-side guide grooves 58 and 60.

As soon as retention devices 38 of filter element 10 contact the case-side part of counter-retention device 39, further movement of filter element 10 in installation direction 12 is stopped. In this position, steps 50 of lower guide crosspieces 46 engage in the corresponding shoulders 62 of the cover-side low guide crosspieces 60. In the end position of filter element 10, spring arms 52 of low guide crosspieces 48 abut, under mechanical spring tension in the direction of the x-axis, the corresponding walls of the cover-side low guide grooves 60.

Subsequently, housing cover 21 is placed on housing case 19 and filter housing 11 is closed. Filter element retention device 34 and thus filter element 10 is held between the case-side connecting flange 64 and the cover-side connection flange 72 in an axial manner relative to the z-axis.

In FIGS. 10 to 12, a filter element 10 is depicted according to a second embodiment. In contrast to the first embodiment from FIGS. 1 to 9, in the second embodiment, there is arranged an elastic element 176 between springs arms 52 and the exterior side of the corresponding end plate 32. By means of elastic elements 176, an elastic restoring force of spring arms 52 is magnified axially to the x-axis.

FIGS. 13 to 19 depict an air filter 13 according to a third embodiment. In contrast to the first embodiment from FIGS. 1 to 9, the third embodiment has steps 50 of low guide crosspieces 48 located, on the downstream side, at a greater distance behind filter element retention device 34. In addition, pleat heights 22 of filter bellows 16 are constant. Downstream side 30 is therefore plane. The downstream edges of end plates 32 are correspondingly straight. Air outlet 17 leads out of housing case 19 opposite from longitudinal sides 34. Between spring arms 52 and the exterior side of the corresponding end plate 32, there is arranged, similar to the second embodiment from FIGS. 10 to 12, an elastic element 176 in each.

FIGS. 20 to 26 depict an air filter 13 according to a fourth embodiment. In contrast to the third embodiment from FIGS. 13 to 19, no elastic elements 176 are provided here behind spring arms 52.

FIGS. 27 to 28 depict an air filter 13 according to a fifth embodiment. In contrast to the first embodiment from FIGS. 1 to 9, here the filter element retention device 34 with seal 42 is arranged at the level of upstream side 28. In addition, filter bellows 16 and end plates 32 are stepped on the downstream side 30. Between guide crosspieces 46 and 48 and filter element retention device 34, there is arranged a gap.

In addition, high guide crosspieces 46 are arranged on a front edge side 26 next to an other longitudinal side 24 than on the other front edge side 26. Accordingly, low guide crosspieces 48 are each arranged next to an other longitudinal side 24. In addition, the distance between longitudinal sides 24 and the corresponding adjoining guide crosspieces 46 and 48 is greater on one longitudinal side 24 than on the other longitudinal side 24.

Grip elements 56 project laterally out in an axial manner to the x-axis at the level of the upstream side 28. Housing cover 21 has a continuous opening 178 for each of the grip elements 56. For a correctly installed air filter 13, grip elements 56, as depicted in FIG. 28, can be seen from the outside. Housing case 19 has on its case-side connecting flange 64 corresponding projections 180, which engage behind grip elements 56 when air filter 13 is installed.

Figure 29:
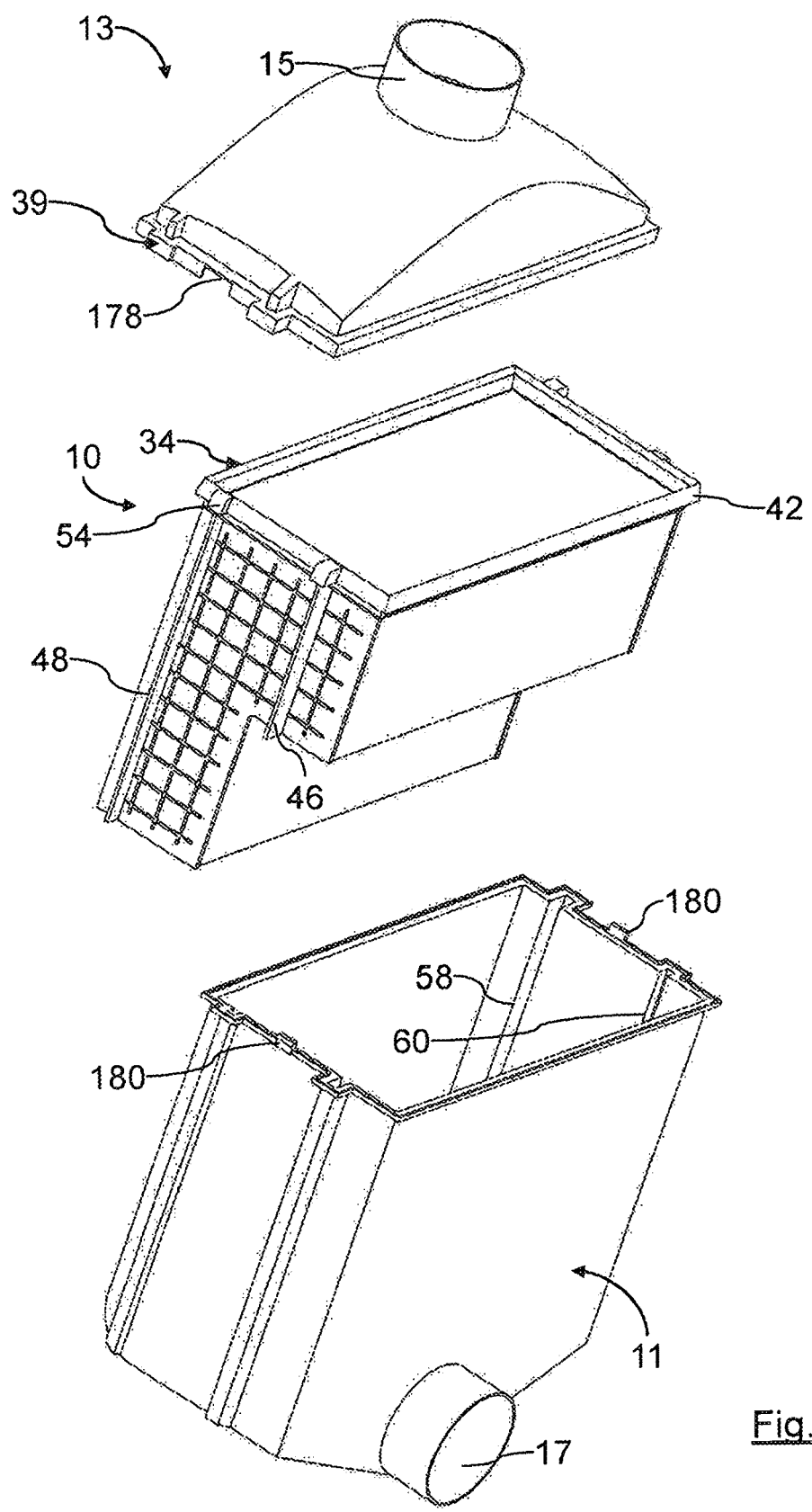
FIGS. 29 to 31 depict an air filter according to a sixth embodiment.
Figure 31:
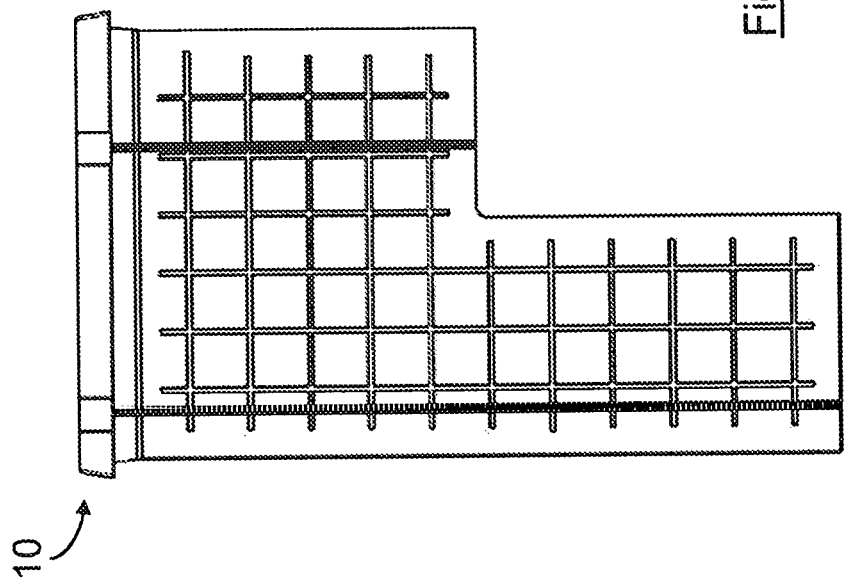
Figure 30:
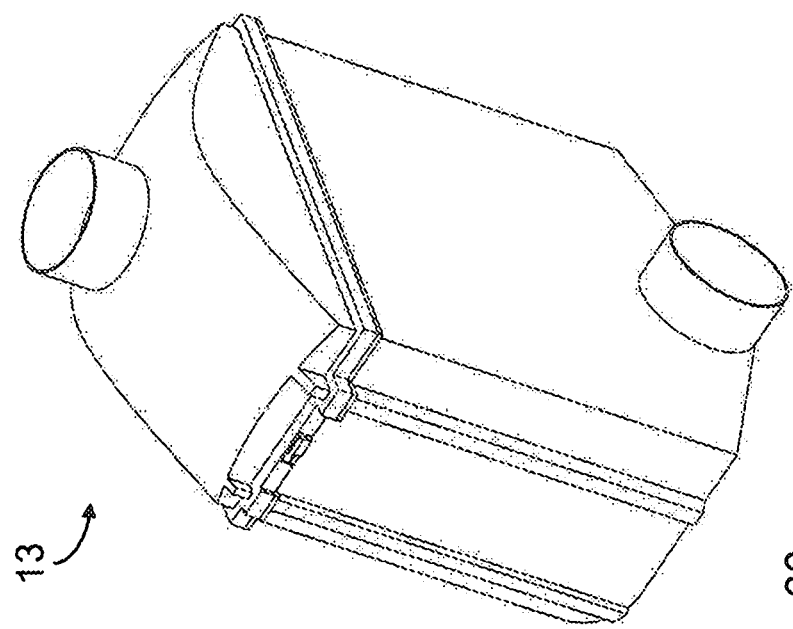
Figure 35:
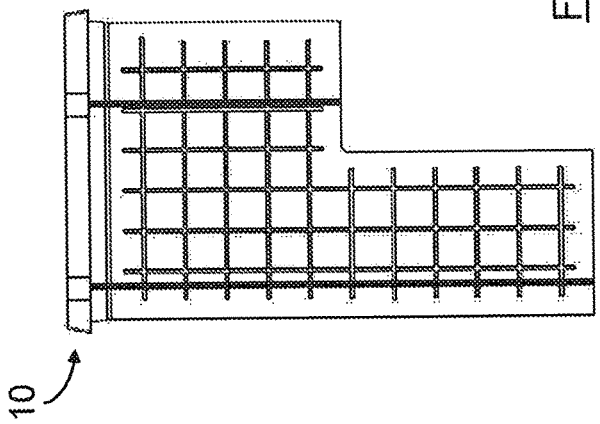
Figure 36:
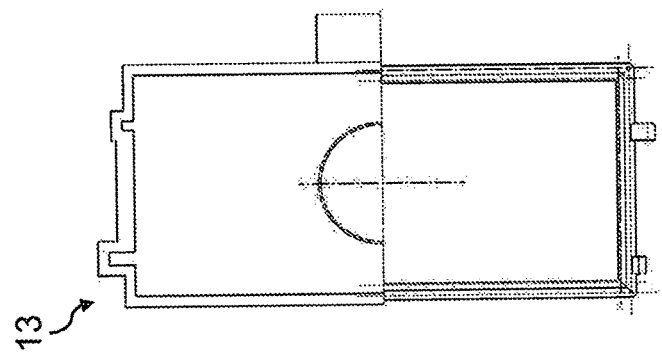
Figure 34:
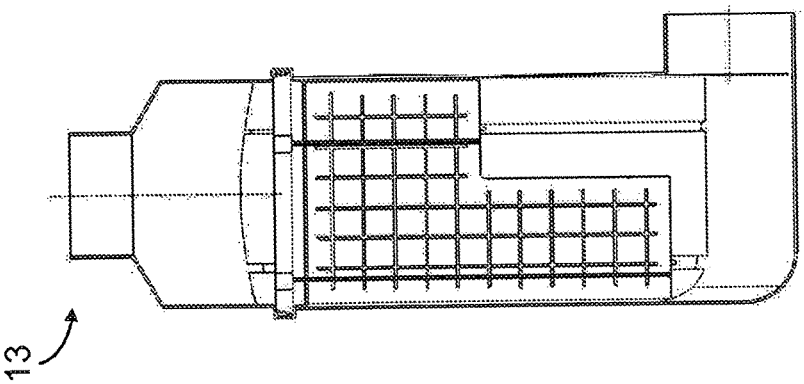
Figure 38:
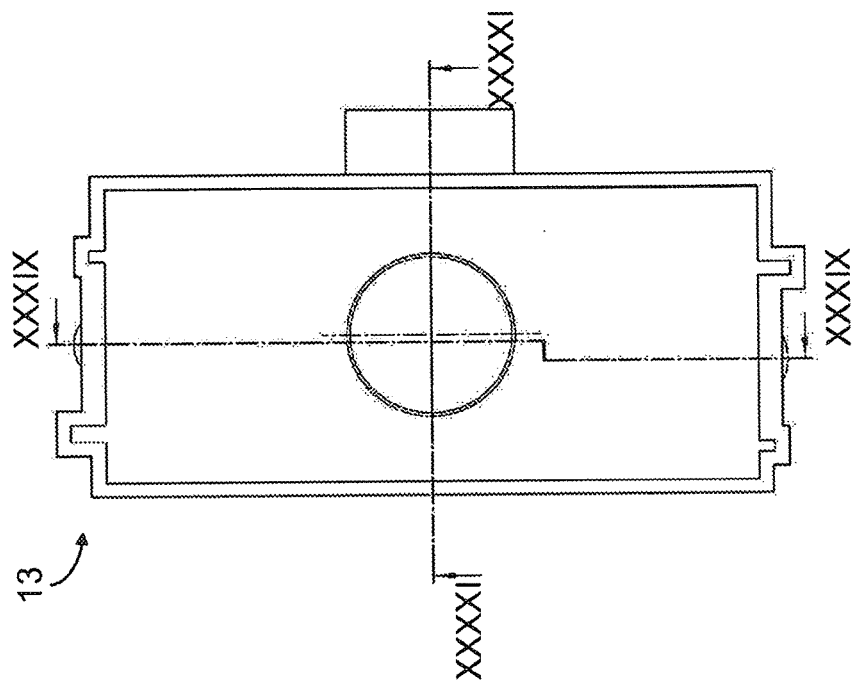
FIGS. 37 to 42 depict an air filter according to an eighth embodiment.
Figure 37:
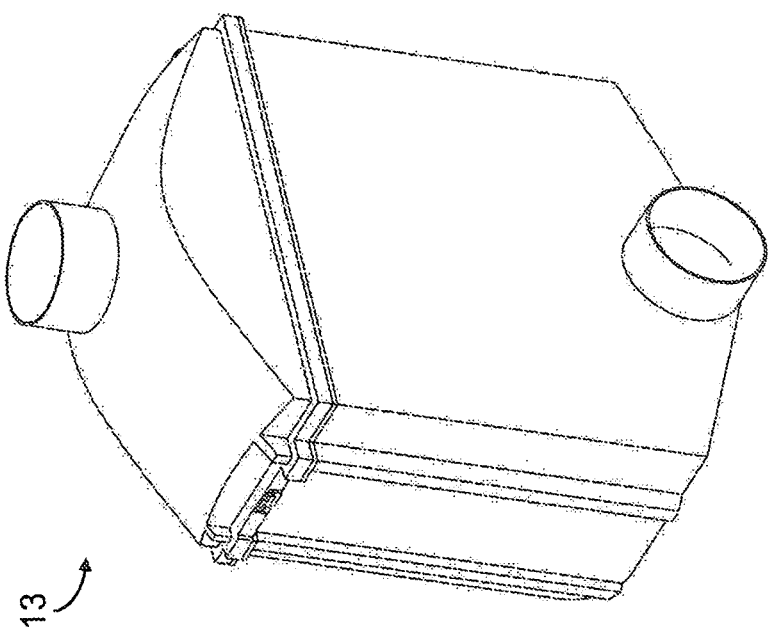
Figure 40:
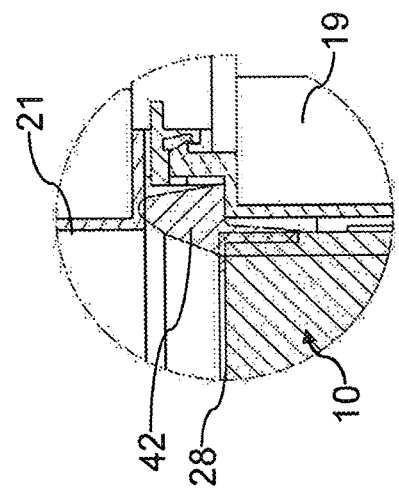
Figure 39:
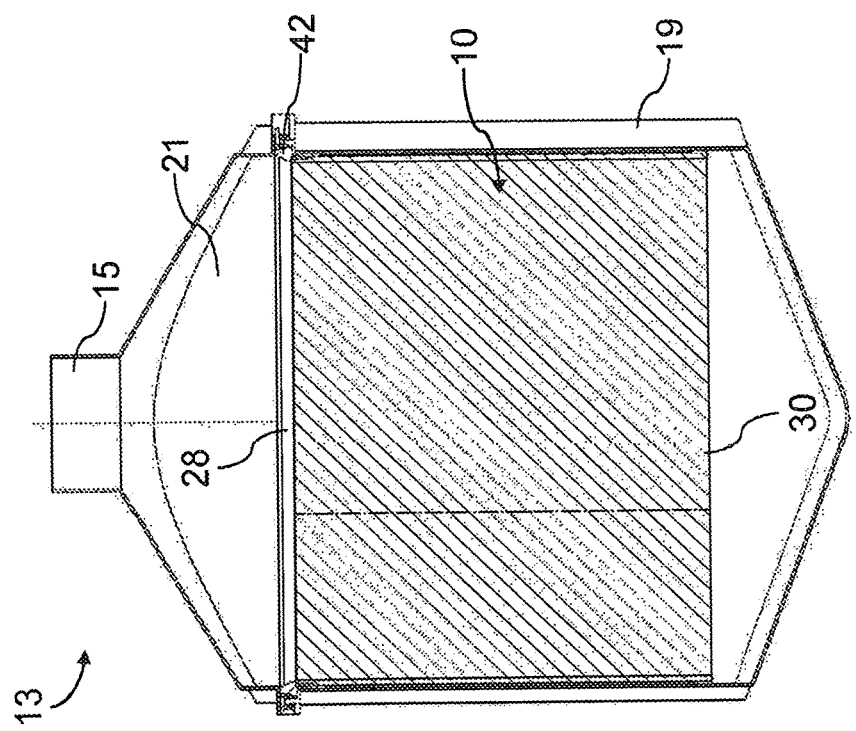
Figure 42:
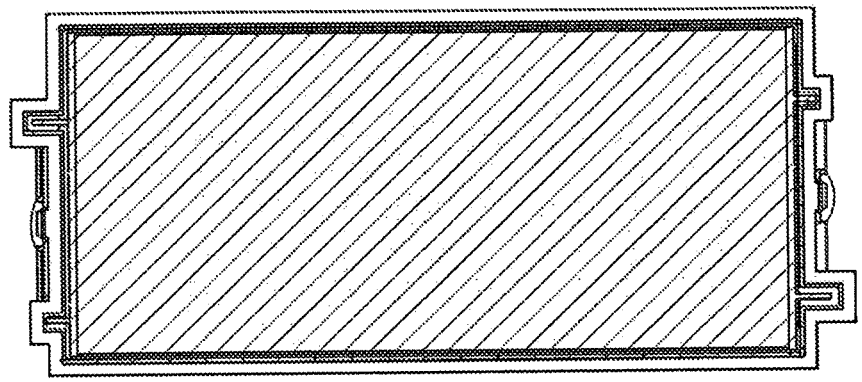
Figure 41:
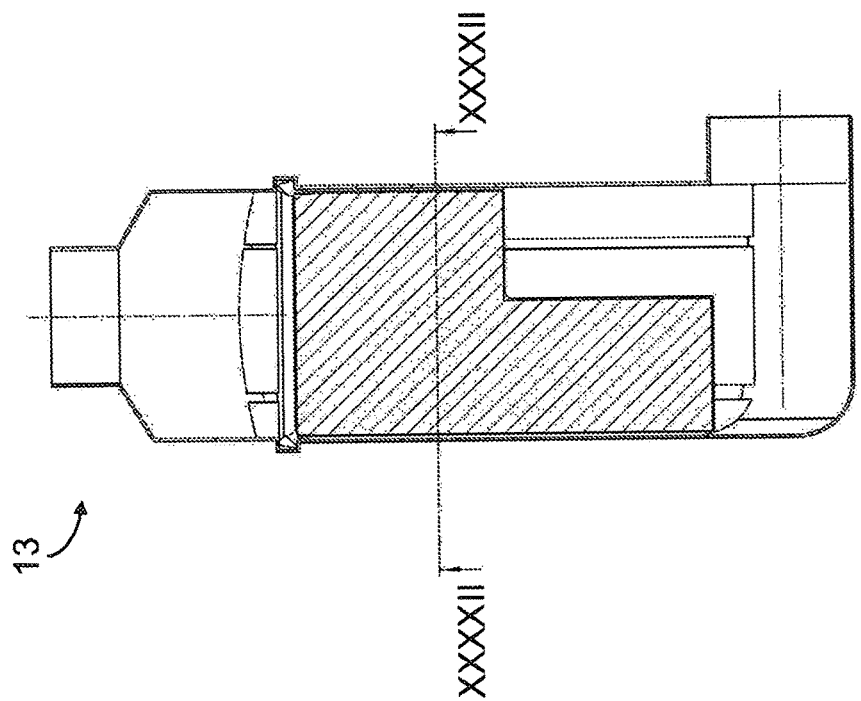
Figures 43, 44:
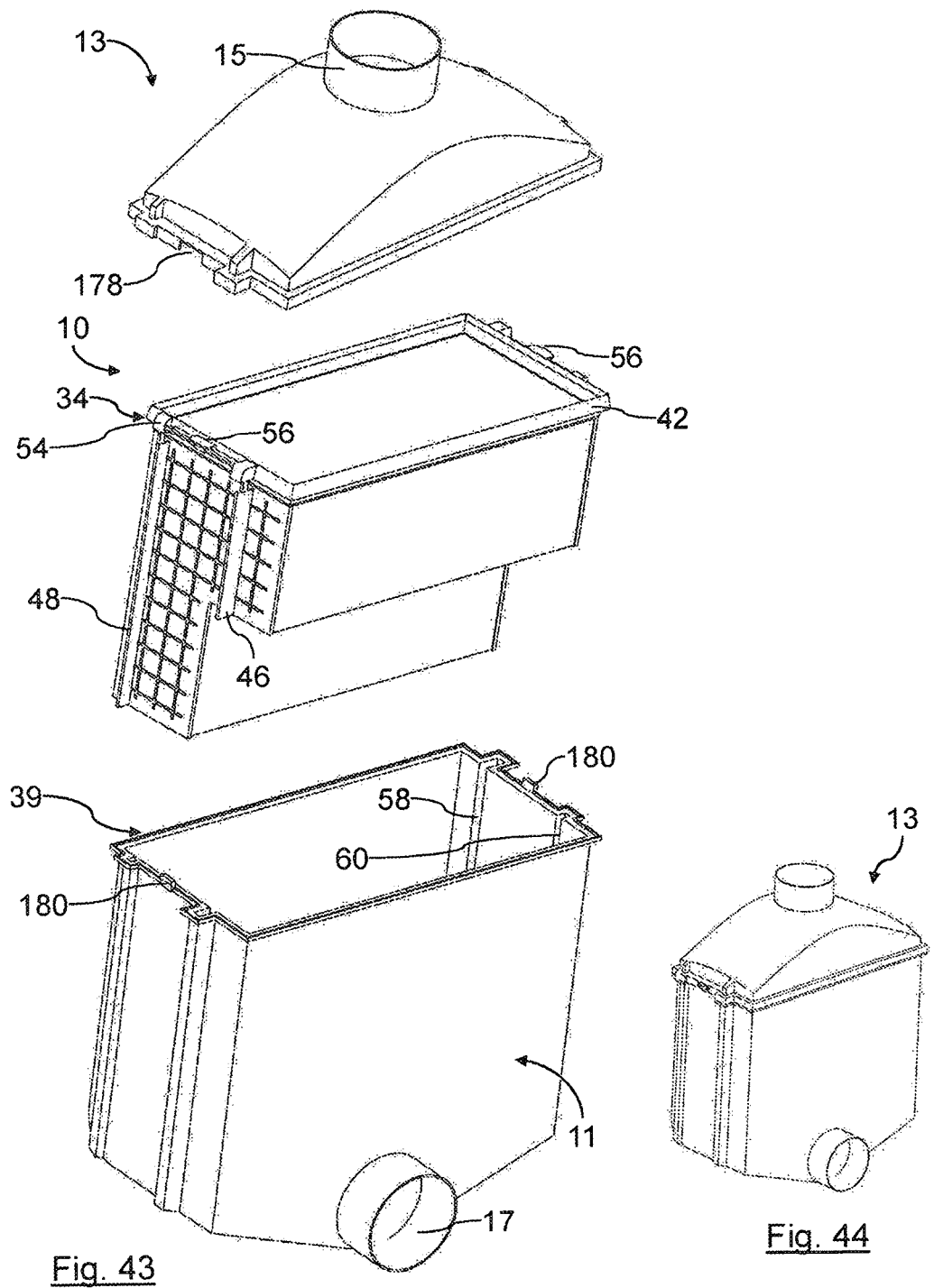
FIGS. 43 to 47 depict an air filter according to a ninth embodiment.
Figure 46:
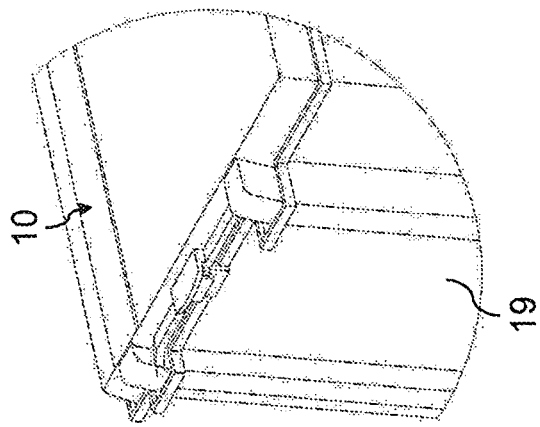
Figure 47:
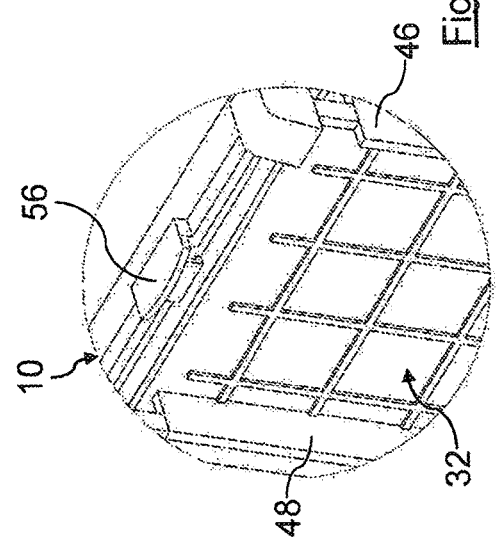
Figure 45:
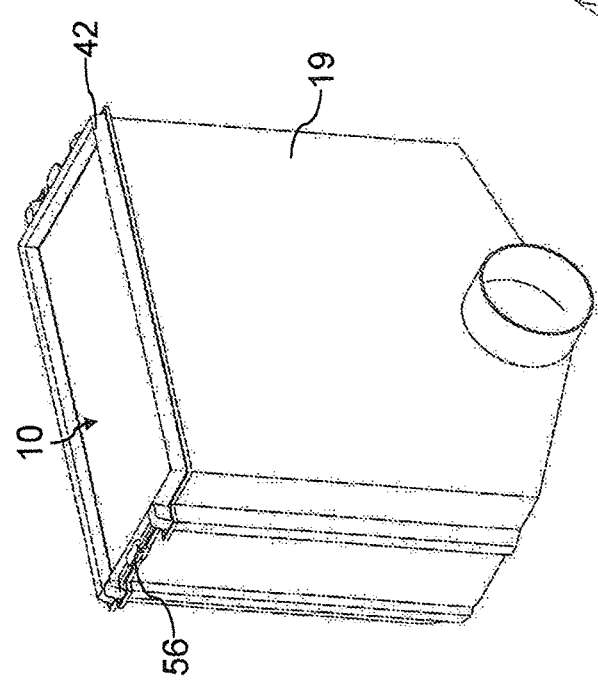

FIGS. 29 to 31 depict an air filter 13 according to a sixth embodiment. In contrast to the fifth embodiment from FIGS. 27 and 28, no grip elements 56 are provided here for filter element 10. In addition, guide crosspieces 46 and 48 transition gaplessly into filter element retention device 34.

FIGS. 32 to 36 depict an air filter 13 according to a seventh embodiment. The seventh embodiment is similar to the sixth embodiment from FIGS. 29 to 31.

FIGS. 37 to 42 depict an air filter 13 according to an eighth embodiment. The eighth embodiment is similar to the sixth embodiment from FIGS. 29 to 31 and the seventh embodiment from FIGS. 32 to 36.

FIGS. 43 to 47 depict an air filter 13 according to a ninth embodiment. The ninth embodiment is similar to the fifth embodiment from FIGS. 27 and 28.

What is claimed is:

1. An filter element for installation in a filter housing for filtering a fluid, comprising:
    a filter body of a filter medium, the filter body having:
        an upstream end face in which the fluid to be filtered enters the filter body, and a downstream end face where filtered fluid exits the filter body; and having an element axis defined as a direction from the upstream end face to the downstream end face, the element axis defining an axial direction as use herein;
    wherein the filter element is arrangeable parallel or axially to an installation direction for installing the filter element into the filter housing;
    wherein the filter body includes a plurality of peripheral sides arranged radially outwardly from the element axis, including:
        a first peripheral side extending from the upstream end face to the downstream end face of the filter body;
        an opposing second peripheral side extending from the upstream side to the downstream side of the filter body;
    wherein an X axis is defined as an axis having a direction traverse to the element axis and extending through the filter body from the first peripheral side to the second peripheral side;
    a seal arranged on the filter element and running peripherally in a traverse direction relative to the element axis at an exterior of the filter medium, the seal arranged on the filter element;
    a first end plate having
        an upstream side edge, a downstream side edge, and opposing first lateral side and second lateral side edges, the first end plate having an inner side arranged on a first peripheral side of the filter body;
    wherein the seal forms at least two outwardly projecting convex U-shaped bumps, the convex U-shaped bumps of the seal arranged on the a peripheral side of the filter element, the at least two U-shaped bumps projecting radially outwards from the filter element;
    wherein the seal has at least one radially inward convexity arranged peripherally between the at least two U-shaped bumps, the at least one radially inwarld convexity arranged adjacent to the at least two U-shaped bumps.

2. The filter element according to claim 1, wherein,
    the at least two outwardly projecting convex U-shaped bumps are each arranged on a same peripheral side of the filter element, each arranged in an opposite corner region of the same peripheral side of the filter element and spaced apart by the at least one radially inwarld convexity.

3. The filter element according to claim 2, wherein
    at least two of the at least two outwardly projecting convex U-shaped bumps of the seal and at least one of the at least one radially inward convexity of the seal are arranged on a radially outer surface of the first end plate.

4. The filter element according to claim 1, wherein
    the first end plate includes grip element forming a handle for removing or installing the filter element into the filter housing, the grip element formed an and projecting axially outwardly from the upstream side edge or the downstream side edge of the first end plate.

5. The filter element according to claim 1, wherein
    the filter medium of the upstream end face or the downstream end face has a region offset axially inwardly, forming a concave region in the respective one of the end faces.

6. The filter element according to claim 5, wherein
    the upstream side edge or the downstream side edge of the first end plate has concavity forming a continuation of the concave region in the respective one of the end faces.

7. The filter element according to claim 1, wherein the filter medium of the filter body is pleated, having a plurality of pleats, each pleat formed by a filter medium fold having an upstream pleat edges at the upstream side end face of the filter medium and downstream pleat edges at the downstream end face of the filter medium.

8. The filter element according to claim 7, wherein
    a pleat height of each pleat is defined as a distance from the upstream pleat edge to the downstream pleat edge of the pleat;
    wherein the pleat height of the filter bellows varies across the plurality of pleats.

9. A filter housing of a filter, comprising:
    at least one inlet for fluid to be filtered and at least one outlet for filtered fluid;
    wherein the filter housing is adapted to receive at least one filter element according to claim 1 in such a manner that the seal with the at least two U-shaped bumps and the at least one radially inwarld convexity seal against complimentary geometry of the filter housing to sealably separate the at least one inlet from the at least one outlet;
    wherein the filter housing has a housing axis, which aligned parallel to the filter element axis and aligned with an installation direction of the filter element into the filter housing;
    wherein the filter housing has a counter retaining device arranged at an installation opening, the counter retaining device including at least one U-shaped bump projecting axially outwardly from the filter housing and configured to engage a respective U-shaped bump of the seal of the filter element filter element.

10. An air filter for an internal combustion engine of a motor vehicle, comprising:
    a filter element according to claim 1; and
    a filter housing including:
        at least one inlet for air to be filtered and at least one outlet for filtered air;
        wherein the filter housing is adapted to receive the filter element in such a manner that the seal with the at least two U-shaped bumps and the at least one radially inwarld convexity seal against complimentary geometry of the filter housing to sealably separate the at least one inlet from the at least one outlet;
        wherein the filter housing has a housing axis, which aligned parallel to the filter element axis and aligned with an installation direction of the filter element into the filter housing;
        wherein the filter housing has a counter retaining device arranged at an installation opening, the counter retaining device including at least one U-shaped bump projecting axially outwardly from the filter housing and configured to engage a respective U-shaped bump of the seal of the filter element filter element.

* * * * *